(12) United States Patent
Rangarajan et al.

(10) Patent No.: US 8,665,361 B1
(45) Date of Patent: Mar. 4, 2014

(54) ENHANCING IMAGING PERFORMANCE THROUGH THE USE OF ACTIVE ILLUMINATION

(75) Inventors: Prasanna Rangarajan, Dallas, TX (US); Vikrant R. Bhakta, Dallas, TX (US); Marc P. Christensen, McKinney, TX (US)

(73) Assignee: Southern Methodist University, Dallas, TX (US)

(*) Notice: Subject to any disclaimer, the term of this patent is extended or adjusted under 35 U.S.C. 154(b) by 551 days.

(21) Appl. No.: 12/785,334

(22) Filed: May 21, 2010

(51) Int. Cl.
*H04N 5/228* (2006.01)
*H04N 5/222* (2006.01)

(52) U.S. Cl.
USPC ........................... 348/370; 348/222.1

(58) Field of Classification Search
USPC ............... 348/222.1, 252, 253, 370; 382/263, 382/266, 269
See application file for complete search history.

(56) References Cited

U.S. PATENT DOCUMENTS

| | | | |
|---|---|---|---|
| 5,616,912 A | 4/1997 | Robinson et al. | |
| 5,912,768 A | 6/1999 | Sissom et al. | |
| 6,229,913 B1 | 5/2001 | Nayar et al. | |
| 7,019,826 B2 | 3/2006 | Vook et al. | |
| 7,518,712 B2 | 4/2009 | Sadoulet et al. | |
| 7,783,440 B1 | 8/2010 | Lewis et al. | |
| 7,844,079 B2* | 11/2010 | Hassebrook et al. | 382/108 |
| 2002/0006282 A1* | 1/2002 | Ushiro et al. | 396/429 |
| 2009/0046164 A1* | 2/2009 | Shroff et al. | 348/222.1 |
| 2011/0169915 A1* | 7/2011 | Bloom et al. | 348/46 |

OTHER PUBLICATIONS

W. Lukosz and M. Marchand, "Optischen Abbildung Unter Ueberschreitung der Beugungsbedingten Aufloesungsgrenze," Opt. Acta 10, 241-255, 1963 (Note: An English translation of this article is on p. 254 of the attached article.).

Daniel A. Vaquero, Ramesh Raskar, Rogerio S. Feris, & Matthew Turk. "A Projector-Camera Setup for Geometry-Invariant Frequency Demultiplexing," In IEEE Computer Vision and Pattern Recognition (CVPR'09).

Zhang & S. K. Nayar, "Projection Defocus Analysis for Scene Capture and Image Display," SIGGRAPH2006, pp. 907-915.

M.A. Neil, R. Juskaitis, T. and T Wilson, "Method of obtaining optical sectioning by using structured light in a conventional microscope," Optics Letters 22, 1905-1907 (1997).

M. Gustaffson, "Surpassing the lateral resolution limit by a factor of two using structured illumination microscopy," J.Microsc.198 (2000).

J. Lin, R. Huang, P. Tsai and C. Lee, "Wide-field super-resolution optical sectioning microscopy using a single spatial light modulator," J. Opt. A: Pure Appl. Opt. 11 (2009).

S. A. Shroff, J. R. Fienup, and D. R. Williams, "Phase-shift estimation in sinusoidally illuminated images for lateral superresolution," J. Opt. Soc. Am. A 26, 413-424 (2009).

(Continued)

*Primary Examiner* — Daniel M Pasiewicz
(74) *Attorney, Agent, or Firm* — Fish & Richardson P.C.

(57) ABSTRACT

A system for capturing super-resolved images includes a camera and a projector. The projector projects a spatially periodic illumination pattern onto the scene to be captured. The spatially periodic illumination patterns may include any pattern or combination of patterns that result in complex modulation. The objects of the scene modulate the spatially periodic illumination patterns, shifting high spatial frequencies into the passband of the camera's optical transfer function. The images may be demodulated, and the demodulated components may be combined with un-modulated components. The resulting image has characteristics of the high spatial frequencies previously beyond the optical passband of the camera.

30 Claims, 18 Drawing Sheets

(56) References Cited

OTHER PUBLICATIONS

J. Garcia, V. Mico, D. Cojoc, and Z. Zalevsky, "Full field of view super-resolution imaging based on two static gratings and white light illumination," Appl. Opt. 47, 3080-2087 (2008).

V. R. Bhakta, et al., "Image-based Measurement of Phase Transfer Function," Dept. of Electrical Engineering, SMU, 2010 Optical Society of America, 3 pages.

D. Lanman, et al., "Build Your Own 3D Scanner: 3D Photography for Beginners," SIGGRAPH 2009 Course Notes, Aug. 5, 2009, 94 pages.

U.S. Appl. No. 13/178,403, filed Jul. 7, 2011, Rangarajan et al.

U.S. Appl. No. 13/026,141, filed Feb. 11, 2011, Bhakta et al.

J. B. Morton, et al. "*A Posteriori* method of image restoration," Image Processing Institute, Univ. Southern Calif., J. Opt. Soc. Am., vol. 69, No. 2, Feb. 1979, 11 pages.

J. T. Olsen, et al. "Comparison of tilted slit and tilted edge super-resolution modulation transfer function techniques," Optical Engineering, Jan. 2007, vol. 46(1), 9 pages.

A. B. Utkin, et al., "On the relation between the wave aberration function and the phase transfer function for an incoherent imaging system with circular pupil," Eur. Phys. J. D. 17, 145-148 (2001), 6 pages.

S. Chen, et al., "Active Sensor Planning for Multiview Vision Tasks," Springer-Verlag, 2008, 274 pages.

M. Halioua, et al., "Projection moire with moving gratings for automated 3-D topography," Applied Optics, vol. 22, No. 6, Mar. 15, 1983, 6 pages.

R. Heintzmann, et al., "Breaking the resolution limit in light microscopy," Briefing in Functional Genomics and Proteomics, vol. 5, No. 4, 289-301, (2006), 13 pages.

D. Q. Huynh, et al., "Calibrating Structured Light Stripe System: A Novel Approach," Int'l Journal of Computer Vision 33(1), 73-86 (1999), 14 pages.

P. Rangarajan, et al., "Surpassing the Diffraction-limit of Digital Imaging Systems using Sinusoidal Illumination Patterns," Department of Electrical Engineering, Southern Methodist University, Dallas, TX, Optical Society of America, 2009, 3 pages.

Anonymous ECCV submission, "Perspective Imaging under Structured Light," Paper ID 951, Mar. 17, 2010, 14 pages.

Anonymous ECCV submission, Perspective Imaging under Structured Light 'Supplementary Material,' Mar. 17, 2010, 8 pages.

P. Rangarajan, et al., "Perspective Imaging under Structured Light," Lyle School of Engineering, Southern Methodist University, Dallas, TX, Mar. 17, 2010, 14 pages.

J. Salvi, et al., "A state of the art in structured light patterns for surface profilometry,"Institute of Informatics and Applications, University of Girona, Girona, Spain, Mar. 18, 2010, 36 pages.

S. Zhang, et al., "Novel method for structured light system calibration,:" Optical Engineering, 45(8), Aug. 2006, 8 pages.

H. H. Hopkins, "Image shift, phase distortion and the optical transfer function,:" Optica Acta, 1984, vol. 32, No. 3, 345-368, 24 pages.

T. Chen, "New 3D Scanning Techniques for Complex Scenes," Ph.D. thesis 2008, Max-Planck-Institut für Informatik, Saarbrüken, Germany, 115 pages.

R. Hartley, et al., "Multiple View Geometry in Computer Vision Second Edition," Chapter 6 "Camera Models," Cambridge University Press, 2003, 19 pages.

M. Martinez, et al., "Progress in Optics," Chapter 1 "The Resolution Challenge in 3D Optical Microscopy," Elsevier, 2009, 36 pages.

Z. Zalevsky, et al., "The Concept of Superresolution," Optical Superresolution, Library of Congress, 2004, 19 pages.

Z. Zalevsky, et al., "Geometrical Superresolution," Optical Superresolution, Library of Congress, 2004, 32 pages.

Chen, Shengyong et al., "*Active Sensor Planning for Multiview Vision Tasks*," Springer-Verlag Berlin Heidelberg, ISBN: 978-3-540-77071-8, 2008, 274 pages.

Srinivasan, V. et al., "*Automated phase-measuring profilometry of 3-D diffuse objects,*" Applied Optics, vol. 23, No. 18, Sep. 15, 1984, pp. 3105-3108.

Gustafsson, Mats G.L. et al., "*Doubling the lateral resolution of wide-field fluorescence microscopy using structured illumination,*" Proceedings of SPIE, vol. 3919, 2000, pp. 141-150.

Takeda, Mitsuo et al., "*Fourier transform profilometry for the automatic measurements of 3-D object shapes,*" Applied Optics, vol. 22, No. 24, Dec. 15, 1983, pp. 3977-3982.

Meadows, D. M. et al., "*Generation of Surface Contours by Moiré Patterns,*" Applied Optics, vol. 9, No. 4, Apr. 1970, pp. 942-947.

Barrett, Eamon, "*New approaches to image super-resolution beyond the diffraction limit,*" Unconventional Imaging III, Proc. of SPIE, vol. 6712, 67120D, 2007, 14 pages.

Morgenstern, B. et al., "*Optical Bandwidth Extension in Two Dimensions Beyond the Classical Limit,*" J. Opt. Soc. Am. 54, 1964, pp. 1282-1283.

Micó, Vincente et al., "*Optical Superresolution: Imaging Beyond Abbe's Diffraction Limit,*" Journal of Holography and Speckle, vol. 5, No. 2, American Scientific Publishers, 2009, pp. 1-14.

Lukosz, W., "*Optical Systems with Resolving Powers Exceeding the Classical Limit,*" Journal of the Optical Society of America, vol. 56, No. 11, Nov. 1966, pp. 1463-1472.

Rangarajan, Prasanna et al., "*Incoherent Optical Super-Resolution using Structured Illumination,*" Department of Electrical Engineering, Southern Methodist University, Dallas, TX, Optical Society of America, 2010, 28 pages.

Elkind et al.; Optical Transfer Function Shaping and Depth of Focus by Using a Phase Only Filter; Applied Optics; vol. 42, No. 11; Apr. 10, 2003; 7 pages.

Havranek, Viterslav; Overview of OTF Measurement; Joing Laboratory of Optics of Palacky University and Institute of Physics of the Academy of Sciences of the Czech Republic, Mar. 4, 2002; 24 pages.

Yamada et al., High-resolution Estimation of the Directions-of-Arrival Distribution by Algebraic Phase Unwrapping Algorithms; Nov. 20, 2010; 21 pages.

Office Action issued in U.S. Appl. No. 13/026,141 on Sep. 26, 2013; 19 pages.

\* cited by examiner $N_p$ IS THE NUMBER OF COLUMNS IN THE PROJECTED IMAGE    $M_p$ IS THE NUMBER OF ROWS IN THE PROJECTED IMAGE

| TYPE OF SETUP | SCENE CONSTRAINTS | SETUP AND PATTERN CONSTRAINTS | OPTICAL SUPER RESOLUTION DIRECTION | CALIBRATED |
|---|---|---|---|---|
| FIGURES 3A-3B | NONE | $b_Y = b_Z = 0$<br>PATTERN WITH $\eta_0 = 0$ | ↔ | NO |
| FIGURE 5B | NONE | $b_Y = b_Z = 0$<br>WARP PATTERN WITH $\eta_0 = 0$, BY $H^\infty_{proj2com}$ | ↔ | YES |
| FIGURES 4A-4B | NONE | $b_X = b_Z = 0$<br>PATTERN WITH $\xi_0 = 0$ | ↕ | NO |
| FIGURE 1A OR NOT SHOWN | NONE | $b_X = b_Z = 0$<br>WARP PATTERN WITH $\xi_0 = 0$, BY $H^\infty_{proj2com}$ | ↕ | YES |
| FIGURE 5A | NONE | $b_Z = 0$, PATTERN WITH $\xi_0 \neq 0, \eta_0 \neq 0$<br>SUCH THAT $\frac{\xi_0}{N_p} b_X + \frac{\eta_0}{M_p} b_Y = 0$ | ONLY $\tan^{-1}\left(\frac{\xi_0}{N_p} \cdot \frac{M_p}{\eta_0}\right)$ | NO |
| FIGURE 1C | NONE | $b_Z = 0$, WARP PATTERN WITH $\xi_0 \neq 0, \eta_0 \neq 0$,<br>BY $H^\infty_{proj2com}$ SUCH THAT $\frac{\xi_0}{N_p} b_X + \frac{\eta_0}{M_p} b_Y = 0$ | ONLY $\tan^{-1}\left(\frac{\xi_0}{N_p} \cdot \frac{M_p}{\eta_0}\right)$ | YES |
| FIGURES 2A-2B | NONE | $b_X = b_Y = b_Z$<br>FOR ALL $\xi_0, \eta_0$ | ALL $\tan^{-1}\left(\frac{\xi_0}{N_p} \cdot \frac{M_p}{\eta_0}\right)$ | NO |
| FIGURE 1B | PLANAR FACET PARALLEL TO THE IMAGE PLANES OF THE CAMERA AND PROJECTOR | FOR ALL $b_X, b_Y, b_Z$<br>FOR ALL $\xi_0, \eta_0$ | ALL $\tan^{-1}\left(\frac{\xi_0}{N_p} \cdot \frac{M_p}{\eta_0}\right)$ | NO |

WHERE $H^\infty_{proj2com}$ IS THE INFINITE HOMOGRAPHY BETWEEN THE PROJECTOR AND THE CAMERA

FIG. 1D

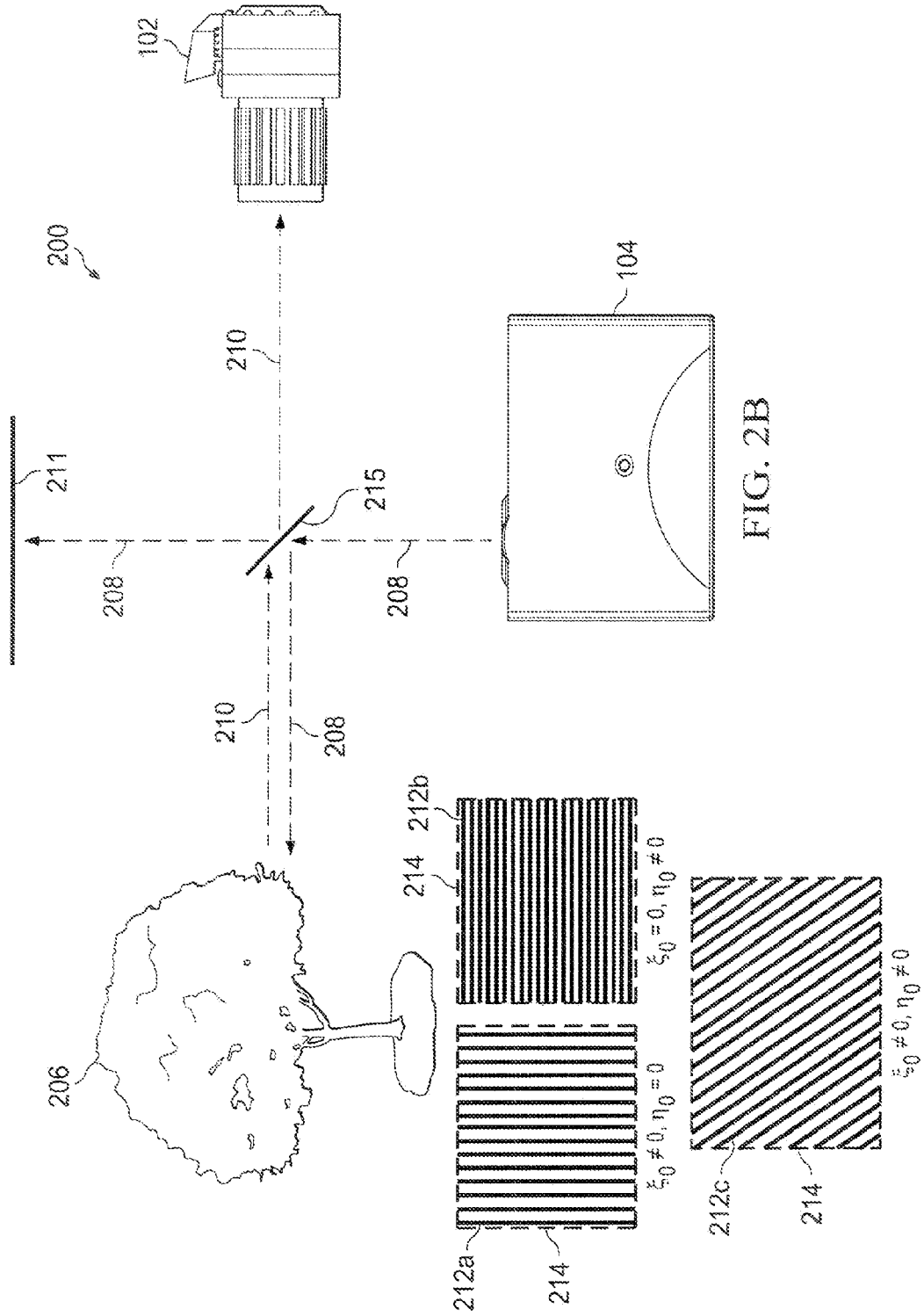

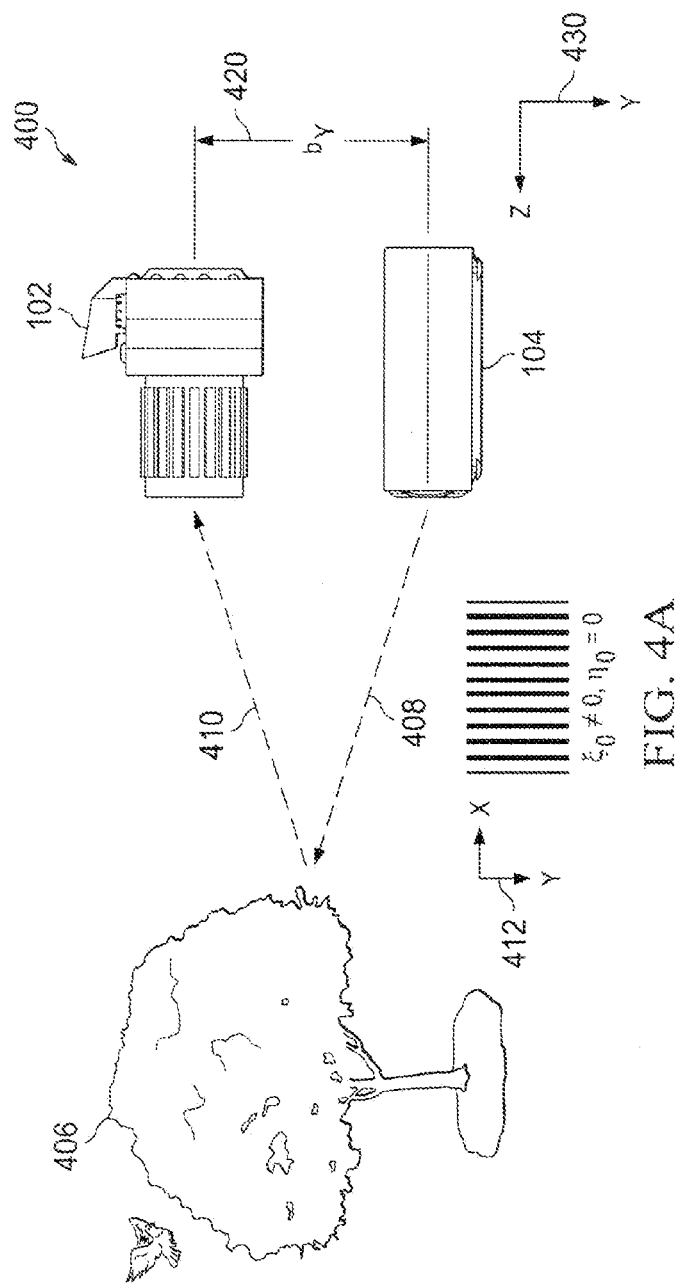

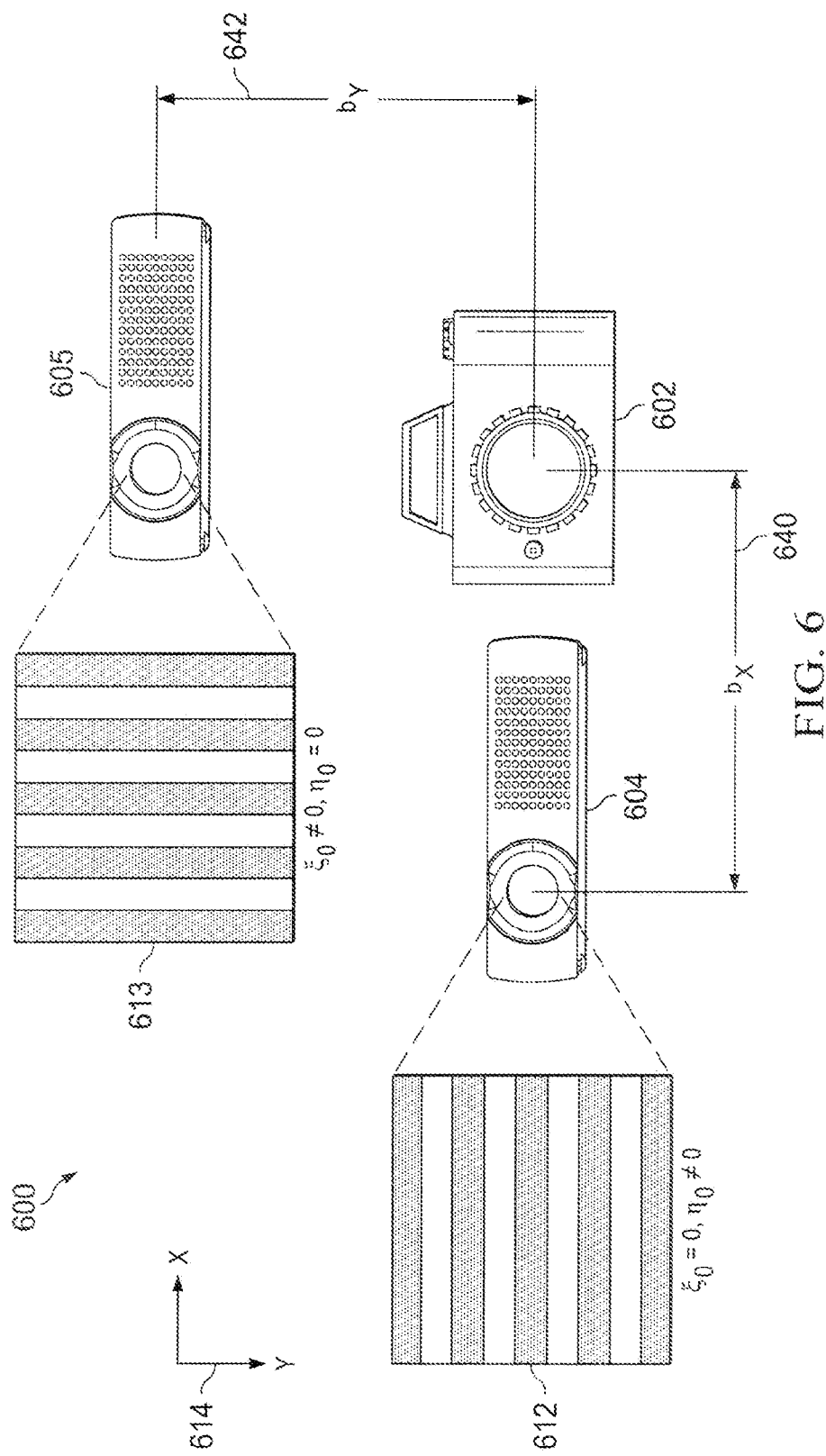

ENHANCING IMAGING PERFORMANCE THROUGH THE USE OF ACTIVE ILLUMINATION

This invention was made with government support under grant number YFA 6835 awarded by the Defense Advanced Research Projects Agency (DARPA). The government has certain rights in the invention.

TECHNICAL FIELD

The present disclosure relates to optical superresolution using the projection of structured illumination.

BACKGROUND

The resolution of a digital imaging system may be limited by diffraction due, for example, to diffraction limits of the imaging system. Imaging systems may behave as filters with finite bandwidth, and spatial detail in the scene may be lost.

SUMMARY

In some embodiments, the system of the present disclosure includes an illumination system operable to project a plurality of illumination patterns onto an object. The illumination patterns may define a spatial periodicity. The system may also include an imaging system comprising a position spatially disposed from the projector, the camera being operable to capture an image. The plurality of illumination patterns may have an orientation based on the position and orientation of the illumination system relative to the imaging system.

In some embodiments, a method for capturing images of a scene includes identifying a plurality of spatially periodic patterns. The plurality of spatially periodic patterns may be determined based on the spatial orientation of an illumination system relative to an imaging system. The method may also include illuminating the scene with the plurality of spatially periodic patterns using the illumination system. At least one image of the scene may be captured with the imaging system, and the at least one image may include a plurality of modulated components. The plurality of modulated components may be based on the spatially periodic patterns modulated by the scene. The method may also include identifying at least one modulation frequency for the at least one captured image and using the identified modulation frequency to demodulate the modulated components of the at least one image. The demodulated at least one image may then be stored.

In some embodiments, a perspective imaging apparatus may include a perspective illumination system capable of projecting a plurality of illumination patterns. The plurality of illumination patterns may define a spatial periodicity. The illumination system may include an illumination center of perspective and the perspective imaging apparatus comprising an imaging center of perspective. The imaging system may be spatially disposed from the illumination system such that imaging center of perspective and the illumination center of perspective define a baseline, the baseline having a direction. The spatial periodicity of the plurality of illumination patterns may be oriented in a direction orthogonal to the baseline direction.

In some embodiments, the apparatus may include a perspective illumination system having an illumination center of perspective, operable to project a plurality of illumination patterns. The plurality of illumination patterns may define a spatial periodicity oriented in the vertical direction. The apparatus may also include a perspective imaging system, which may have an imaging center of perspective horizontally disposed from the illumination center of perspective.

In some embodiments, the apparatus may include a perspective illumination system having an illumination center of perspective operable to project a plurality of illumination patterns. The plurality of illumination patterns may define a spatial periodicity oriented in the horizontal direction. The apparatus may also include a perspective imaging system having an imaging center of perspective vertically disposed from the illumination center of perspective.

In embodiments of the disclosure, a method for recovering spatial frequencies may include identifying an orientation of a periodic illumination pattern. The method may also include illuminating a scene with the periodic illumination pattern. The method may further include capturing at least one image of the scene, the periodic illumination pattern modulated by the scene, and capturing at least one raw image of the scene. A frequency of the pattern from the captured images may be identified. The method may also include generating the captured image of the scene under complex sinusoidal illumination and generating the raw image of the scene under uniform or ambient illumination. The generated modulated image may be demodulated and combined with the raw image.

In some embodiments, a method for recovering spatial frequencies may include identifying the infinite homography relating to an illumination system and an imaging system. An orientation of a period illumination pattern based on the identified homography may also be identified. The method may also include identifying at least one modulated image of the scene, the periodic illumination pattern modulated by the scene. At least one raw image of the scene may also be identified. The method may further include identifying a frequency of the modulating pattern from the identified modulated image. The at least one identified modulated image may be demodulated and combined with the at least one raw image.

In some embodiments, a method of synthesizing an optical transfer function may include identifying one or more frequencies of a periodic illumination pattern based on a shape and support of a desired optical transfer function. At least one modulated image of the scene may be identified, where the periodic illumination pattern may be modulated by the scene. The method may include identifying at least one raw image of the scene and demodulating the at least one modulated image. The raw image and the demodulated image may be combined.

In some embodiments, a method for realizing computational band-pass filtering may include identifying a frequency of a periodic illumination pattern based on a center frequency of a band-pass filter. An image of a scene may be identified under complex sinusoidal illumination. The identified image may be demodulated and stored.

In certain instances of the embodiments, the illumination system includes an illumination optical axis and an illumination center of perspective, and the imaging system includes an imaging optical axis and an imaging center of perspective. The illumination optical axis and the imaging optical axis may be parallel or substantially parallel. The imaging center of perspective may be vertically disposed relative to the illumination center of perspective, and the spatial periodicity of the plurality of illumination patterns may be oriented horizontally.

In certain instances of the embodiments, the illumination system includes an illumination optical axis and an illumination center of perspective, and the imaging system includes an imaging optical axis and an imaging center of perspective. The illumination optical axis and the imaging optical axis may be parallel or substantially parallel. The imaging center of perspective may be horizontally disposed relative to the illumination center of perspective, and the spatial periodicity of the plurality of illumination patterns may be oriented vertically.

In certain instances of the embodiments, the optical axes of the imaging and illumination systems are parallel or substantially parallel. The center of perspective of the imaging system and the center of perspective of the illumination system may be separated by a slanted or diagonal baseline, and the spatial periodicity of the plurality of illumination patterns is oriented orthogonal to the diagonal baseline.

In certain instances of the embodiments, the optical axes of the imaging and illumination systems are not parallel, but the centers of perspective of the imaging and illumination systems are located in the same pupil plane. The spatial periodicity of the plurality of illumination patterns may be prewarped such that the patterns appear periodic to imaging system. The warping of the pattern is based on the "orientation" of the imaging system relative to the illumination system. For example, in certain embodiments, the imaging system's center of perspective may be disposed horizontally from that of the illumination system. In such an instance, the pattern may be prewarped such that the orientation of the spatial pattern appears periodic in the vertical direction when viewed by the imaging system. In certain instances, the center of perspective of the imaging system is vertically disposed relative to that of the illumination system. The spatial pattern may be prewarped such that when viewed by the imaging system, it has a horizontal periodicity.

In certain instances of the embodiments, the imaging system and the illumination system share an optical axis.

In certain instances of the embodiments, the spatial periodicity of the illumination patterns is oriented horizontally.

In certain instances of the embodiments, the spatial periodicity of the illumination patterns is oriented vertically.

In certain instances of the embodiments, the spatial periodicity of the illumination patterns is oriented at an arbitrary angle relative to the horizontal.

In certain instances of the embodiments, the system and/or apparatus may further include a processor operable to perform operations. Such operations may include receiving one or more captured images from the camera. The operations may also include identifying a modulating frequency component for the one or more captured images and using the modulation frequency to demodulate the one or more captured images based on the modulation frequency. The processor may identify un-modulated components for the one or more captured images and combine the un-modulated components of the captured image with the demodulated components of the captured image.

In certain instances of the embodiments, the illumination system is a first illumination system and the plurality of illumination patterns is a first plurality of illumination patterns. The system may further include a second illumination system capable of projecting a second plurality of illumination patterns onto an object. The orientation of the plurality of illumination patterns is based on the position and orientation of the second illumination system relative to the imaging system.

In certain instances of the embodiments, an un-modulated image of the scene may be identified. The un-modulated image may be combined with the demodulated image to form a combined image. The resulting combined image may be stored.

In certain instances of the embodiments, identifying the at least one modulated image of the scene may include capturing the at least one modulated image of the scene.

In certain instances of the embodiments, identifying the at least one modulated image of the scene may include generating the image of the scene under complex sinusoidal illumination.

In certain instances of the embodiments, identifying the at least one raw image of the scene may include capturing at least one raw image of the scene under uniform or ambient illumination.

In certain instances of the embodiments, identifying at least one raw image of the scene may include generating the raw image of the scene under uniform or ambient illumination.

Certain instances of the embodiments may include performing aliasing management on the at least one image.

In certain instances of the embodiments, identifying a modulation frequency may include calculating a Fourier transform of the at least one image, and determining one or more modulation frequencies from the Fourier transform of the at least one image.

In certain instances of the embodiments, aliasing management may be performed to capture recovered spatial frequencies.

In certain instances of the embodiments, the illumination pattern is prewarped based on the infinite homography relating to an illumination system and an imaging system.

In certain instances of the embodiments, identifying an image of the scene may include synthesizing an image of the scene.

In certain instances of the embodiments, identifying an image of the scene may include capturing an image of the scene under uniform or ambient illumination.

In certain instances of the embodiments, identifying the at least one modulated image of the scene may include capturing the at least one modulated image of the scene.

In certain instances of the embodiments, identifying the at least one raw image of the scene comprises capturing at least one raw image of the scene.

In certain instances of the embodiments, identifying the at least one modulated image of the scene comprises generating the image of the scene under complex sinusoidal illumination.

In certain instances of the embodiments, identifying the at least one raw image of the scene comprises generating raw image of the scene under uniform or ambient illumination.

The details of one or more embodiments described in the present disclosure are set forth in the accompanying drawings and the description below. Other features, objects, and advantages of the present disclosure will be apparent from the description, drawings, and claims.

DESCRIPTION OF DRAWINGS

FIG. 1D is a table showing example configuration parameters for parallel and crossed axis embodiments of the present disclosure.

FIG. 2B is a schematic illustrating a system for achieving structured illumination optical super resolution using a camera coincident to a projector and illustrating example spatial pattern orientations in accordance with embodiments of the present disclosure.

FIG. 4A is a schematic illustrating a system for achieving structured illumination optical super resolution using a camera vertically collocated with a projector and an example illumination pattern orientation in accordance with embodiments of the present disclosure.

FIG. 6 is a schematic illustrating a system for achieving structured illumination optical super resolution using a camera horizontally collocated with a first projector and vertically collocated with a second projector and example illumination pattern orientations in accordance with embodiments of the present disclosure.

DETAILED DESCRIPTION

This disclosure relates, in general, to devices, systems, and methods for achieving Optical Super Resolution (OSR) using structured illumination. In embodiments, the devices, systems, and methods of implementing and achieving OSR overcome the fundamental limit on the resolution of an imaging system without altering its physical parameters.

Figure 9:
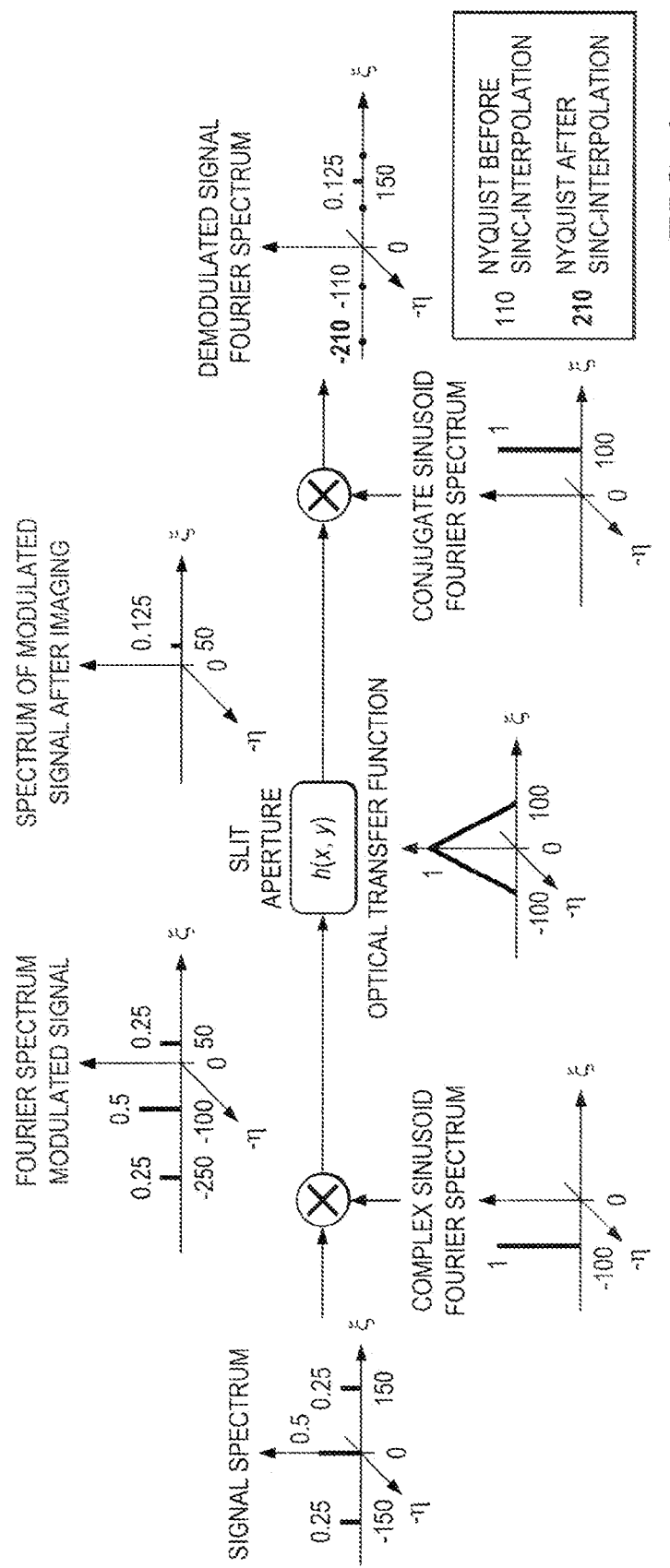
FIG. 9 is a process flow diagram illustrating, by way of example, Structured Illumination based Optical Super-Resolution, for an imaging system with a slit aperture in accordance with the present disclosure.

The OSR systems, methods, and apparatuses described in the present disclosure strive to resolve spatial detail exceeding the optical passband by illuminating the scene with structured light patterns. The term "optical passband" is known to those of ordinary skill in the art and may be understood to mean the set of spatial frequencies that are permitted by the imaging system. FIG. 9, for example, illustrates how spatial frequencies outside the optical passband may be filtered by the optical transfer function associated with, for example, a slit aperture. The optical transfer function acts as a low pass filter with a cutoff frequency of $f_x=|100|$. Spatial frequencies located at $f_x=|150|$ in the example signal spectrum are filtered out by the optical transfer function associated with the slit aperture.

FIG. 9 illustrates the process flow for a one-dimensional OSR process illustrating the Fourier spectra of the DC signal and the modulated signals. The signal spectrum includes peaks at the DC line as well as at $fx=|150|$. The optical transfer function indicates a passband within $ft=|100|$. Thus, for the signal having information at $fx=|150|$, the peaks outside the passband will not be captured by the camera. The complex sinusoid may be modulated by the object to shift the high frequency components to within the passband. In FIG. 9, this is represented by the Fourier spectrum of the modulated signal. In this example, the peaks are shifted to the left (-fx), such that the peak that was at $fx=150$ is now at $fx=50$, and within the passband of the optical transfer function. The remainder of the information shown in the Fourier spectrum in FIG. 9 is outside the passband, and is essentially filtered out. The remaining peak may be demodulated using the conjugate of the sinusoid used in the spatial pattern. An example complex sinusoid Fourier transform and its conjugate are shown in FIG. 9. After demodulation, the peak may be seen in the Fourier spectrum as residing at the original frequency prior to the modulation. These high frequency peaks correspond to an increase in the resolution of the image (i.e., optical super resolution). Further, FIG. 9 illustrates aliasing management based on sinc-interpolation to expand the Nyquist band to encompass the frequencies now present in the super-resolved image. Sinc-interpolation, for example, addresses issues with aliasing that may arise when the demodulated spatial frequencies exceed the Nyquist frequency of the imaging system.

The principle underlying the proposed method for OSR is the ability to modulate the amplitude of a periodic pattern with scene information. In particular, modulating the amplitude of a sinusoid with scene information prior to imaging by a camera allows the camera to directly capture spatial frequencies that exceed the bandwidth of the camera lens assembly. Demodulation (performed either within the camera or external to the camera) restores the modulated spatial detail to a position proximate the original spatial frequency. The demodulated and the raw image captured by the camera may be combined to obtain the super-resolved image. Further, the band pass image or images may contain information that may be useful on their own for applications such as fingerprint matching. Thus, the band pass images (i.e., the modulated images) may be used without combining them with the raw image data.

Figure 3A:
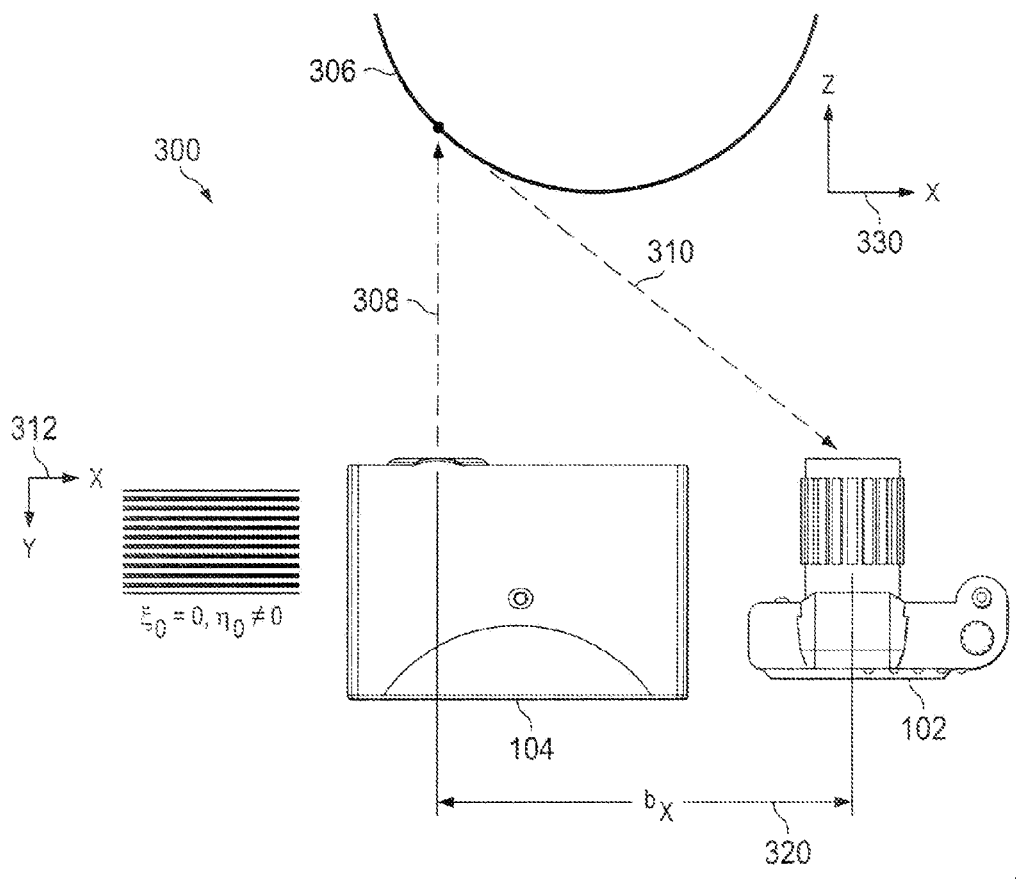
FIG. 3A is a schematic illustrating a system for achieving structured illumination optical super resolution using a camera horizontally collocated with a projector in accordance with embodiments of the present disclosure.
Figure 3B:
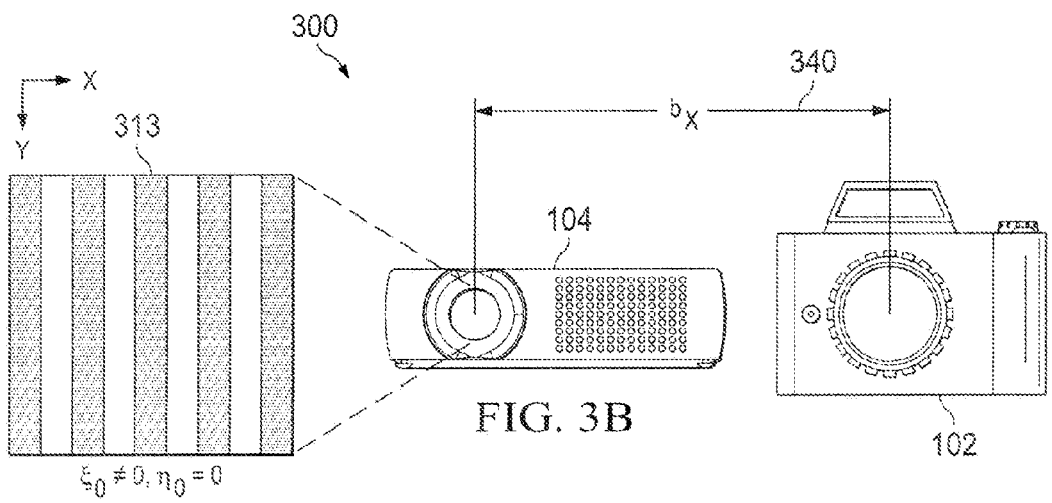
FIG. 3B is a schematic illustrating a system for achieving structured illumination optical super resolution using a camera horizontally collocated with a projector and illustrating an example spatial pattern orientation in accordance with embodiments of the present disclosure.
Figure 3C:
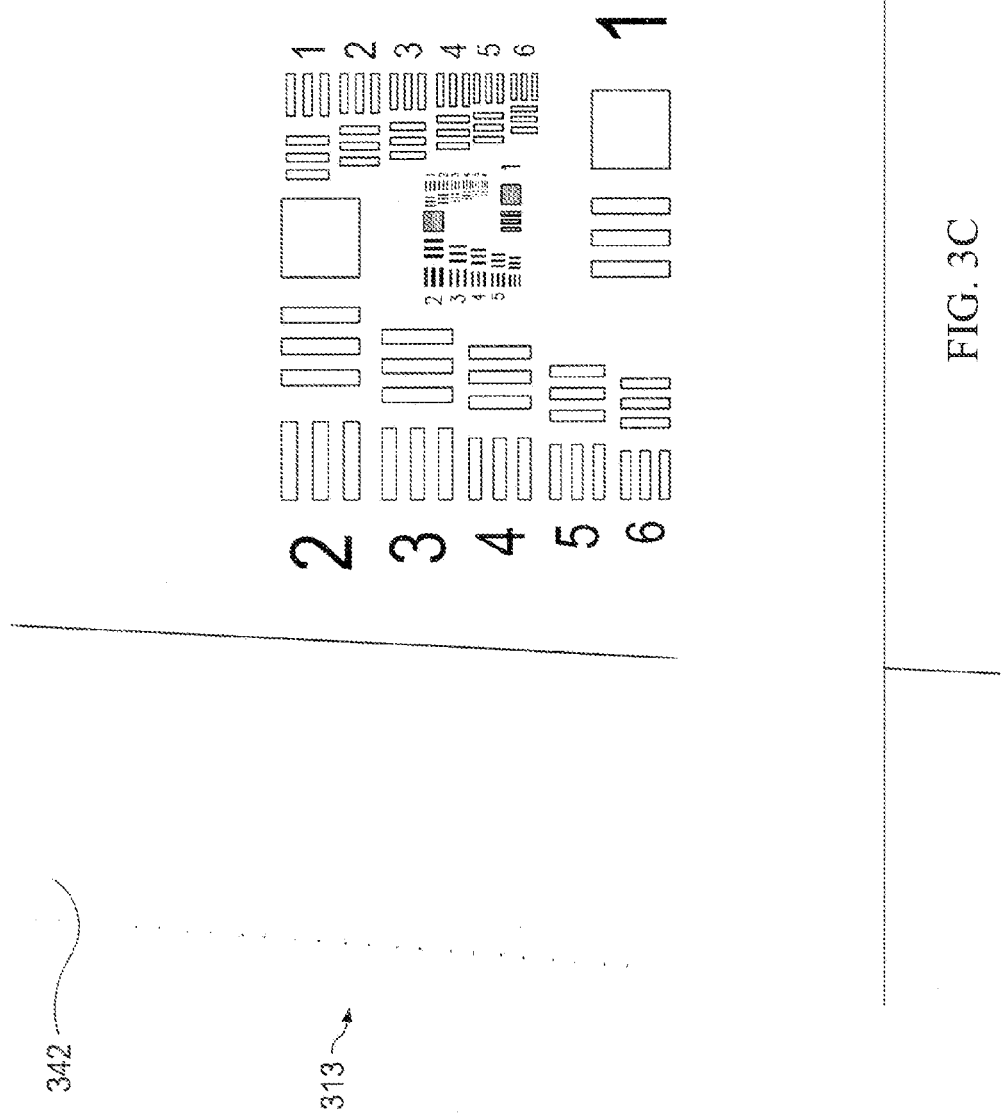
FIG. 3C is a schematic illustrating scene dependent distortion in the projected pattern as seen by the camera, due to the difference in the camera and projector viewpoints.

The proposed method realizes complex sinusoidal modulation by illuminating the scene with a series of phase shifted patterns. The difference in viewpoint between the imaging and illumination systems may induce scene dependent frequency+phase distortion in the observed periodic pattern, affecting the ability to realize pure amplitude modulation. For example, FIG. 3C illustrates the resulting distortion in an observed periodic pattern based on the difference in view point between a camera and a projector. The present disclosure reveals a family of camera+projector arrangements that can realize pure amplitude modulation, independent of scene geometry.

Figure 1A:
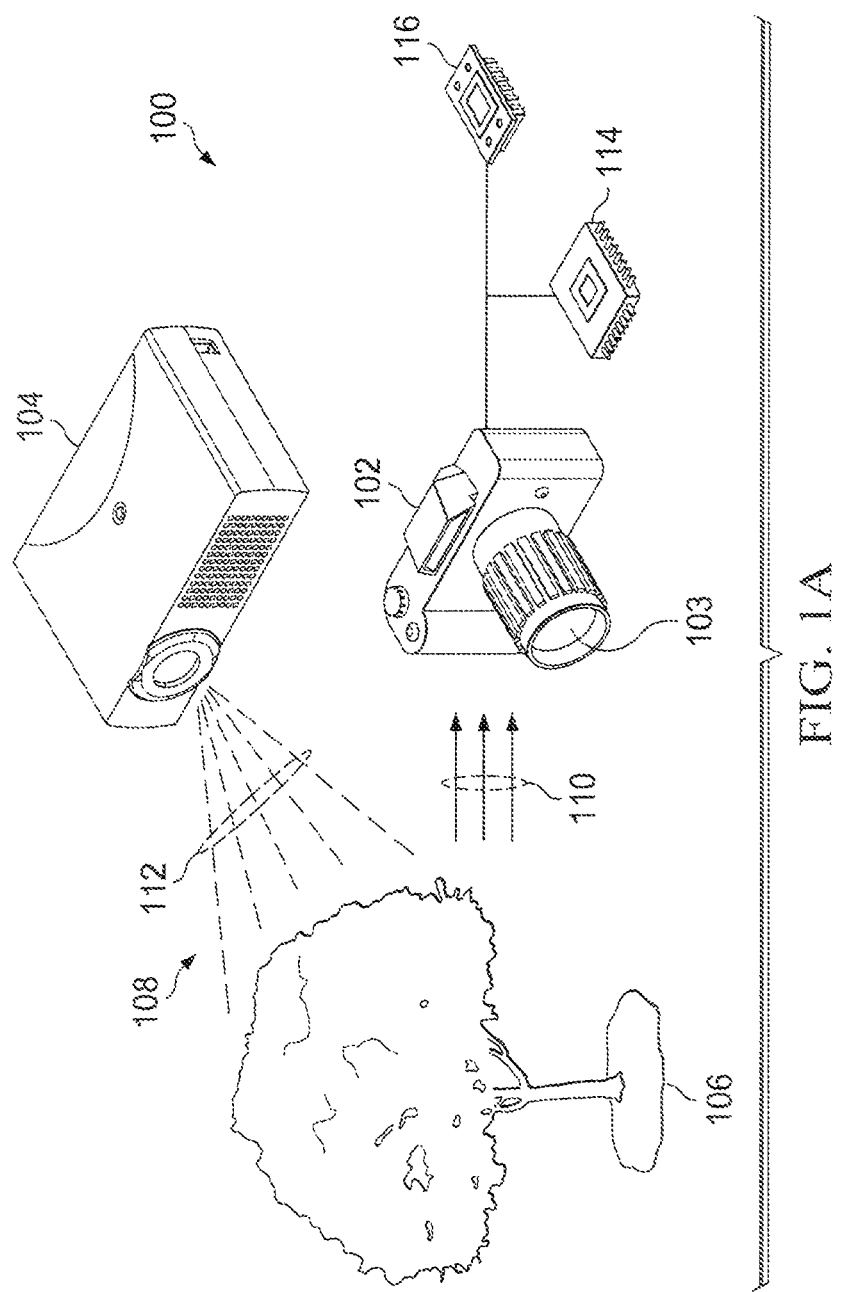
FIG. 1A is a schematic illustrating a system for achieving structured illumination optical super resolution in accordance with embodiments of the present disclosure.

FIG. 1A is a schematic illustrating system 100, which includes an imaging device 102 and an illumination system 104. FIG. 1A illustrates the imaging system as a camera, but it is to be understood that the imaging system 102 may be any imaging device. Illumination system 104 is shown in FIG. 1A as a projector, but could be any illumination system capable of projecting spatial patterns In embodiments, the structure of the illumination patterns may be configured or selected by a user. For the sake of brevity, the term "illumination system" may be used interchangeably with the word "projector." It is to be understood that the illumination system may be any illumination system capable of projecting spatial patterns onto a scene, and the use of the term "projector" is not meant to limit the scope of the present disclosure. Likewise, the term "imaging system" may be used interchangeably with the word "camera" throughout this disclosure without deviating from the scope of the claims. FIG. 1A illustrates illumination system 104 projecting structured light 108 onto an object 106. Object 106 is the subject of a scene to be captured by camera 102, and may be of arbitrary shape and size. The light 108 projected by the illumination system 104 may be incoherent light or coherent light, and includes structured patterns 112. In embodiments, the structured patterns 112 may be a sinusoid, such as those that can be combined to yield a complex sinusoid during processing. An example is to successively project raised sine and cosine patterns (e.g., $0.5 \pm 0.5 \sin(2\pi\xi_0 x)$, $0.5 \pm 0.5 \cos(2\pi\xi_0 x)$), and digitally recombine the results using Euler's formula, to realize complex sinusoidal modulation. In embodiments, the patterns may be any set of patterns that allows one to represent the patterns such that the mathematical combination of the collective images results in a modulation of the image signal, which can then be demodulated. Further, the structured patterns may be oriented horizontally or vertically, or may be oriented at an angle relative to the horizontal, consistent with the disclosure below. In addition, the structured patterns may be represented as binary patterns from the projector.

In embodiments, camera 102 may have components including, but not limited to, a lens 103 and an image sensor (not shown), and may also include internal processing 114 and memory 116. Camera 102 may be tethered, connected to, or integrated into another electronic device, such as a personal computer ("PC") or a personal communications device, such as a cellular phone, smart phone, personal digital assistant, BlackBerry®, iPhone, etc. As such, certain components, such as a processor 114 or memory 116 may be external to the camera unit but in communication therewith. FIG. 1A illustrates the camera 102 and projector 104 as located separately from one another, but a plurality of camera/projector configurations are contemplated by this disclosure including, but not limited to, configurations where the camera and projector are integrated into a single device or housing. Camera 102 is shown as a hand-held, personal camera, but it is to be understood that camera 102 may be any camera capable of capturing one or more images of a scene. Further, camera 102 may be a monochrome camera or a color camera. Further, camera 102 may be a digital or analog camera. Camera 102 includes a lens and image sensor (not shown) that captures light 110 from the object 106.

Figure 1B:
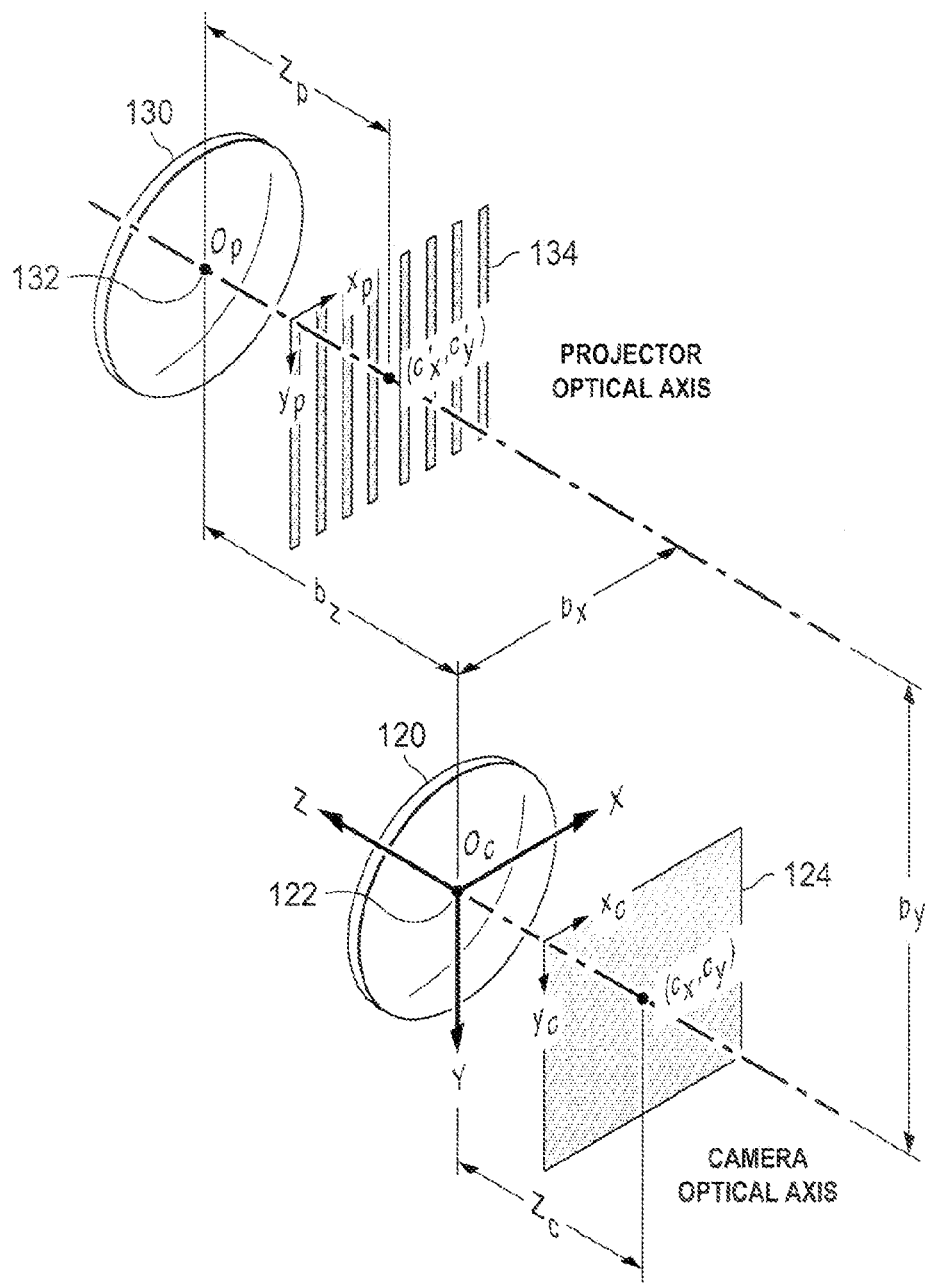
FIG. 1B is a schematic illustrating configuration geometry for the basic components of a system or apparatus for achieving structured illumination.

FIG. 1B is a schematic illustrating components of an example imaging system and of an example illumination system. Specifically, FIG. 1B illustrates an imaging system lens 120 (here, a camera lens) spatially disposed from a lens 130 associated with an illumination system (here, a projector lens). Center of perspective Oc 122 and center of perspective Op 132 may generally be defined as a theoretical point or area associated with the intersection of optical rays projected or received through the lens. In embodiments, the center of perspective may be approximated as the center of a lens for certain types of lenses. For compound lens assemblies, the center of perspective may be the center of the entrance pupil. In certain embodiments, the illumination system and/or the imaging system may not have a lens, but each may still include or define a center of perspective. The pupil plane may be defined as a plane containing the center of perspective, whose normal vector is the optical axis (e.g., of the corresponding lens).

Referring to FIG. 1B, lens 120 is separated from camera image plane 124 by a distance Zc; lens 130 is separated from illumination system projection plane 134 by a distance Zp. Further, position of imaging system lens 120 relative to the illumination lens 130 (or vice versa) may be defined herein by a baseline connecting the point Oc 122 and Op 132. In embodiments, the baseline may have a length b and vector components $b_X$, $b_Y$, and $b_Z$, or some combination thereof. For the purpose of the illustration, the optical axes of the camera 102 and the projector 104 are assumed to be parallel or substantially parallel, with the user determining the baseline between the camera and the projector. The term "baseline" is used in this disclosure to mean the direction vector that joins the center of perspective of the camera to that of the projector. In embodiments, Zc defines a distance from the imaging system image plane 124 from the imaging system's center of perspective. Similarly, in certain embodiments, Zp defines a distance between the illumination system center of perspective and the illumination source projection plane 134.

Referring to FIG. 1A, in embodiments, imaging system 102 and the illumination system 104 may be coincident. The term "coincident" is used in this disclosure to mean that the camera and the projector share the same center of perspective. The term "collocated" is used in this disclosure to mean that the center of perspective of the camera and the projector are displaced and do not share an optical axis. In embodiments of a collocated configuration, baseline b may be defined by vector components $b_X$ and $b_Y$, wherein the imaging system shares a pupil plane with the illumination system. It is to be understood, however, that OSR may be achieved in a collocated configuration where the illumination system does not share a pupil plane with the imaging system. For example, the baseline b may have a slight $b_Z$ component such that the pupil planes of the illumination system and the imaging system are parallel or substantially parallel. Small $b_Z$ components to the displacement (e.g., relative to the distance from the centers of perspective of the camera and projector to the scene point) may not affect the operation of the OSR system. Further, the threshold for the magnitude of $b_Z$ may be defined as the point at which the difference in viewpoint between the camera and projector is sufficient to induce distortions (aperiodicities) in the detected illumination pattern (i.e., detected by the camera). In addition, in embodiments of collocated configurations, the pupil plane of the imaging system may not be parallel to the pupil plane of the illumination system. In such embodiments, the baseline b may still lie in the pupil plane of the camera.

Figure 1C:
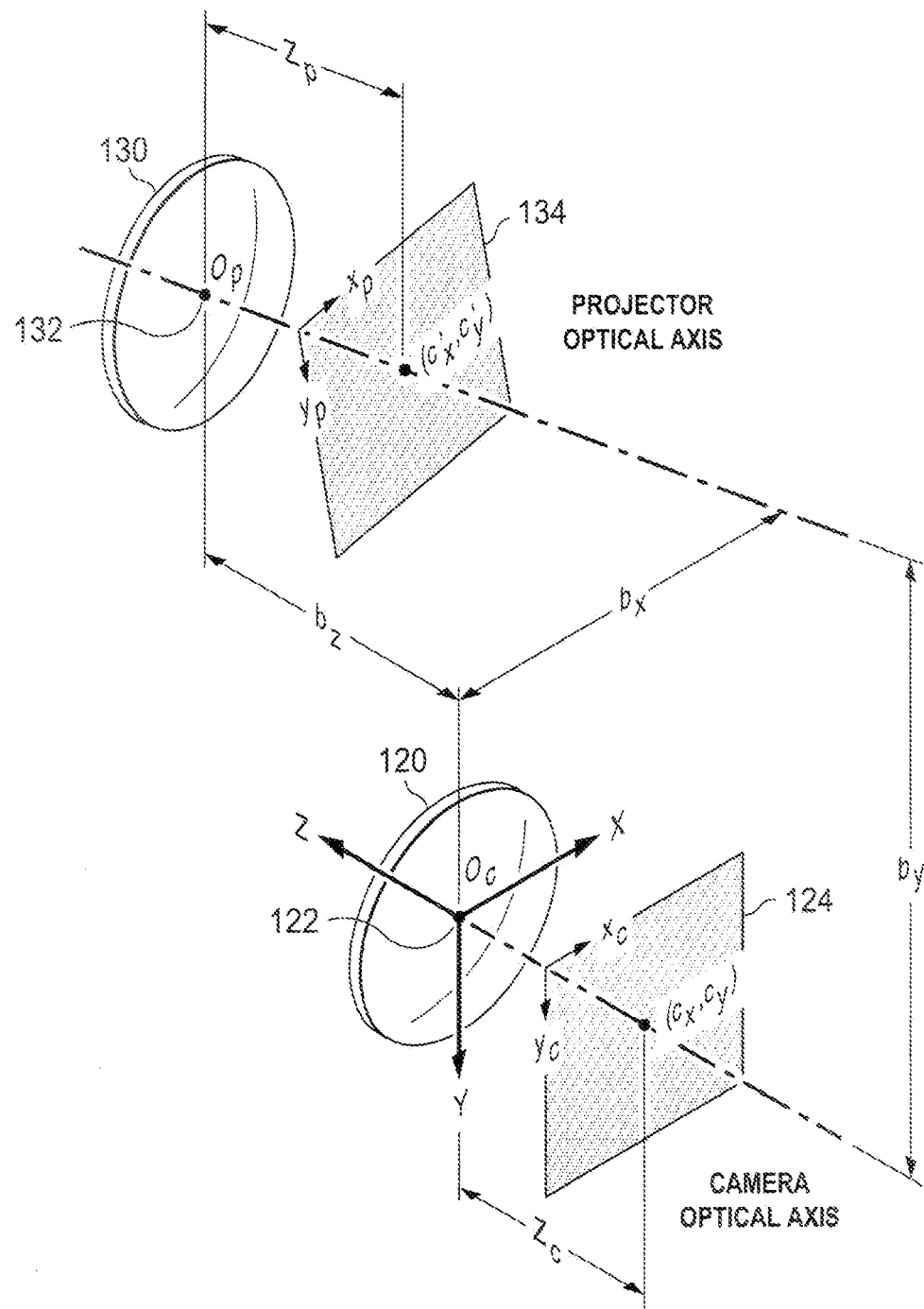
FIG. 1C is a schematic illustrating configuration geometry for the basic components of a crossed axis embodiment of a system or apparatus for achieving structured illumination.

In FIG. 1B, the optical axes for the imaging system and the illumination system may be parallel or substantially parallel. In FIG. 1C, the optical axes are shown to intersect. In this crossed axes configuration, the spatial periodicity of the illumination pattern may be selected and/or configured to project a prewarped pattern such that it appears periodic when viewed by the imaging system.

FIG. 1D is a table describing example configurations for the parallel and crossed axes configurations illustrated by example in FIGS. 1B-C. The term "OSR direction" indicates the orientation of the spatial periodicity of the projected pattern as viewed by the imaging system. The term "calibrated" may be understood to mean that configuration parameters of the system may be known. For example, the spatial relationship of the camera relative to the projector may be known. The term "collocated" on FIG. 1D means that $b_z=0$ and may include configurations with parallel axes or crossed axes.

Figure 2A:
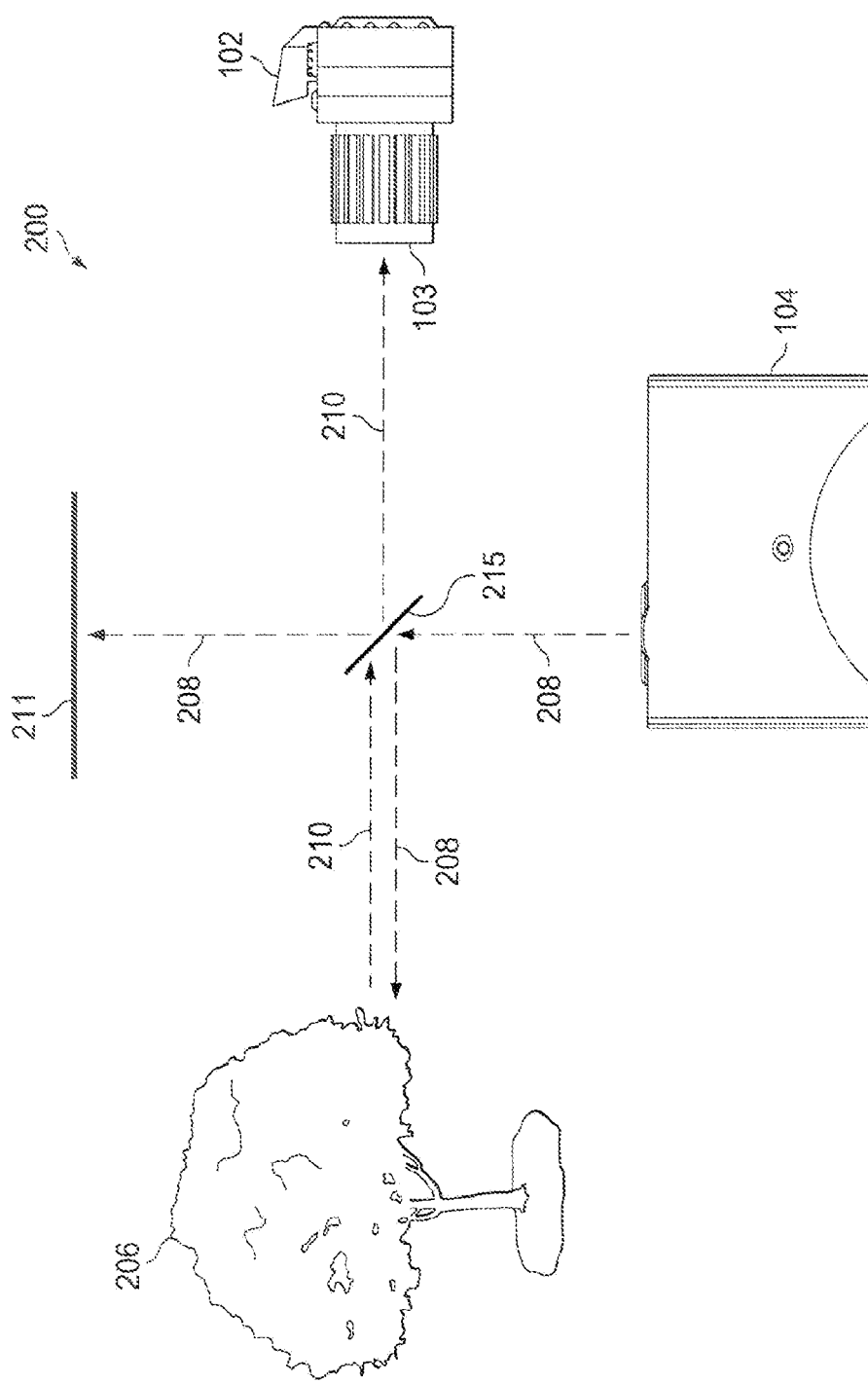
FIG. 2A is a schematic illustrating a system for achieving structured illumination optical super resolution using a camera coincident to a projector in accordance with embodiments of the present disclosure.

FIGS. 2A-B illustrate a coincident configuration. Camera 102 and the projector 104 are shown to be spatially disposed from one another, while sharing the same optical axes. This may be achieved by using optical elements, such as a beam splitter, to redirect light from multiple optical paths into a single optical path. In embodiments, the coincident configuration may be one where the imaging system 102 and the illumination system 104 share the same centers of perspective. FIGS. 2A-B are discussed in more detail below. In embodiments, the camera 102 and the projector 104 may be horizontally, vertically, or arbitrarily collocated. FIGS. 3A, 4A-B, and FIG. 6 illustrate embodiments where the camera 102 is collocated with the projector 104. The image planes of the camera and projector may or may not be parallel.

The OSR method of the present disclosure may involve modulating the amplitude of a periodic pattern with scene information. For an arbitrary camera+projector arrangement, the difference in viewpoint between the camera and projector may induce lateral displacements or frequency changes in the periodic pattern, as observed by the camera. For example, FIG. 3C illustrates a distortion pattern as viewed by a camera that were created based on the difference in viewpoint between the camera and the projector. As such, embodiments of the camera and projector may either be coincident or collocated. Further, the orientation of the spatial pattern used for OSR in a collocated camera+projector setup is parallel or substantially parallel to the baseline between the camera 102 and the projector 104. For example, realizing OSR in a vertically collocated camera+projector setup with parallel optical axes, requires the use of periodic patterns with periodicity in the horizontal direction, and constant intensity in the vertical direction.

Returning to FIG. 1A, depending on the spatial configuration of the camera 102 relative to the projector 104, the projected pattern 108 from the projector 104 may create shadows on the object 106 (e.g., a 3-D object) as viewed by the camera 102. In addition, relative displacement between the camera 102 and projector 104, may induce object 106 dependent distortion in the illumination pattern as viewed by the camera 102. The patterns 112 may be chosen based on the relative orientations and positions of the camera 102 and the projector 104 to control the distortion in the projected pattern 112 as seen by the camera (e.g., to avoid the distortion in the OSR case).

FIG. 1A illustrates the basic system components, whereas other figures described in detail below, illustrate various camera/projector configurations that may be used to achieve optical super resolution. The configurations may be generic and assembled with little consideration to control parameters.

FIGS. 2A-B, for example, illustrate an embodiment of a coincident configuration, where the camera 102 and the projector 104 share the same center of perspective and optical path. FIG. 3A illustrates the camera 102 collocated with projector 104, where camera 102 is displaced horizontally from projector 104. The illumination patterns have a spatial periodicity in the vertical direction (i.e., shown in FIG. 3C as horizontal stripes). In FIG. 3A, camera 102 and projector 104 may have image planes that are parallel. That is, the lenses of the projector and the camera are substantially aligned. In this configuration, the system may achieve super resolution and may estimate depth (i.e., resolve dimensions of the object or scene). The configuration illustrated in FIGS. 4A, B and 6 may also be arranged such that the camera 102 and projector 104 having substantially parallel image planes and may also be used to estimate depth information in addition to achieving optical super resolution. FIG. 5A shows the illumination system collocated from the imaging system, where the collocation displacement has both X and Y components. FIG. 5A shows a corresponding spatial pattern for a parallel axis configuration (i.e., the optical axis of the imaging system is parallel to the illumination system), but FIG. 5A also supports a crossed axis configuration. FIG. 5B shows a crossed axis configuration of the imaging system and the illumination system, as well as a representation of a warped spatial pattern. In embodiments of the crossed axis system, the camera may be horizontally, vertically, or "diagonally" collocated from the projector at an arbitrary or predetermined angle.

Light 110 reflected from the object 106 is received by the lens 103 of camera 102. Light 110 may include scene detail obtained under ambient light (if any) and/or artificial unstructured light, and may include modulated spatial detail from the object 106, due to the projected structured light 108 (if any). As discussed in more detail below, the amplitude of the illumination pattern may be modulated by scene information. In embodiments, the modulation shifts spatial frequencies outside the passband of the imaging system (e.g., camera 102) into the passband. The modulated components may be demodulated to recover the spatial detail representing high spatial frequencies of the object, which would normally fall outside the passband of the imaging system (e.g., the camera lens). The resulting demodulated image signal may be combined with the raw image of the scene obtained under uniform illumination and/or ambient light, to form a super-resolved image.

In embodiments, the demodulation frequency can be determined by examining the input parameters of the structured illumination and the configuration of the camera and projector. In some implementations, the demodulation frequency can be identified as the shift in the peak value of the magnitude spectrum of the camera images obtained in the presence and absence of structured illumination.

FIGS. 2A-B illustrate an embodiment of a system 200 consistent with the present disclosure for achieving optical super resolution. The embodiment illustrated in FIG. 2A represents a coincident hardware configuration, where camera 102 shares the center of perspective and optical axes with the projector 104. In operation, the projector 104 projects structured light 208. In the embodiment shown in FIG. 2A, the projected light is incident upon a beam splitter 215. The projected light 208 is directed by the beam splitter 215 onto the scene 206. Reflected light 210 from the object 206 passes through beam splitter 215 on the same optical path as projected light 208. Reflected light passes through beam splitter 215 and into camera lens 103, where it may be captured and subjected to processing. Some of the projected light 208 passes through beam splitter 215 upon initial incidence, and may be incident upon surface 211 or may be allowed to dissipate without further incidence. FIG. 2A illustrates projected light 208 and reflected light 210 on different physical paths, but this is for illustrative purposes.

FIG. 2B illustrates example illumination patterns 212$a$-$c$ that may be used in the coincident configuration illustrated in FIGS. 2A-B. In a coincident configuration, as in the example one shown in FIGS. 2A-B, the projected light and the light captured by the lens share the same optical path. The lack of spatial distortion of the projected pattern, as seen by the camera in a coincident setup, allows for the use of different orientations for the periodic patterns 212$a$-$c$. Periodic patterns 212$a$-$c$ are shown within image plane 214. The image plane 214 is shown as a rectangular box around each of spatial patterns 212$a$-$c$. For illustrative purposes, the rectangular boxes represent image plane 214 to show that the spatial pattern 212$c$ may be rotated to an arbitrary angle without rotating the image plane 214.

FIG. 3A illustrates an example collocated configuration of system 300, where the pupil planes of the camera 102 and projector 104 are parallel or substantially parallel. In system 300, camera 102 is "horizontally" disposed relative to the projector 104. The horizontal disposition is represented by a displacement $b_X$ 320. In embodiments, displacement $b_X$ 320 may represent the horizontal component of the spatial position of the camera relative to the projector (and/or vice versa, the spatial position of the projector relative to the camera). The orientation of the spatial patterns projected by the projector in the embodiment illustrated in FIG. 3A is shown to be periodic in the y direction, as defined by the Cartesian coordinate system 312 shown in FIG. 3A (not to be confused with coordinate system 330, which defines the direction for the spatial displacement of the camera 102 relative to the projector 104). The camera may receive a signal 310 from the object 306. For a point of reference, Cartesian coordinate map 330 illustrates the reference coordinate directions for system 300. In embodiments, the periodicity of the spatial patterns may be orthogonal to the direction of spatial disposition of the camera relative to the projector. In FIG. 3A, the periodicity of the spatial patterns for achieving optical super resolution of horizontally oriented features of object 306 is shown to be in the y direction. In embodiments, projected light 308 may be a sinusoid, with periodicity in the y direction.

The camera 102 and projector 104 of FIG. 3A are shown with parallel image planes. In such an embodiment, the system configuration shown in FIG. 3A may be used to achieve optical super resolution of horizontal features of object 306 using the spatial patterns orientation depicted by patterns 312. In addition, by rotating patterns 312, by for example, 90 degrees, the projection may produce distortions of the patterns on the object 306. For example, FIG. 3B illustrates the system 300 including camera 102 and projector 104 displaced horizontally from one another by displacement $b_X$ 340. Projector 104 is shown as projecting a spatial pattern 313 having a spatial periodicity oriented in the same direction as the displacement $b_X$ 340 (i.e., horizontal periodicity). With the collocated configuration shown in FIG. 3A (having "horizontal" spatial disposition $b_X$ 340 of the camera 102 relative to the projector 104), distortions may appear. FIG. 3C illustrates an example three dimensional object, such as object 306 shown in FIG. 3A) and projected spatial patterns 313. In FIG. 3C, the periodicity of the spatial patterns is oriented in the vertical direction and distortions 342 appear on the 3-D object. Such a result illustrates an imaging system vertically disposed from the illumination system.

Figure 4B:
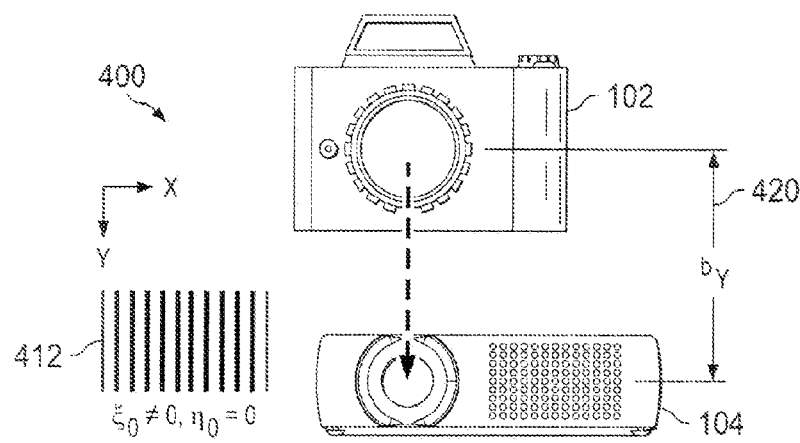
FIG. 4B is a schematic illustrating a different perspective view of the system of FIG. 4A for achieving structured illumination optical super resolution using a camera horizontally collocated with a projector in accordance with embodiments of the present disclosure.
Figure 5A:
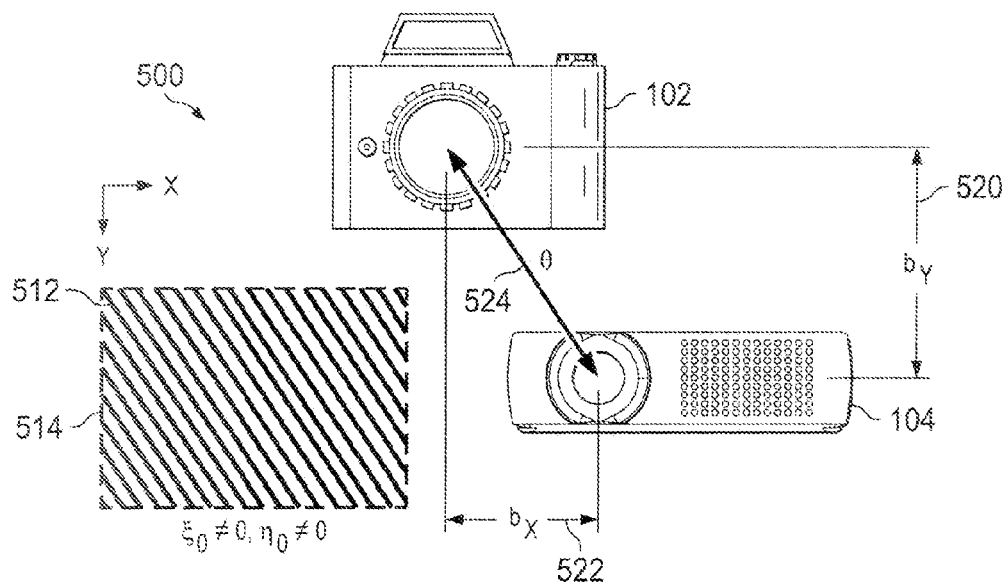
FIG. 5A is a schematic illustrating a system for achieving structured illumination optical super resolution using a camera diagonally displaced with respect to a projector and an example illumination pattern orientation in accordance with embodiments of the present disclosure.
Figure 5B:
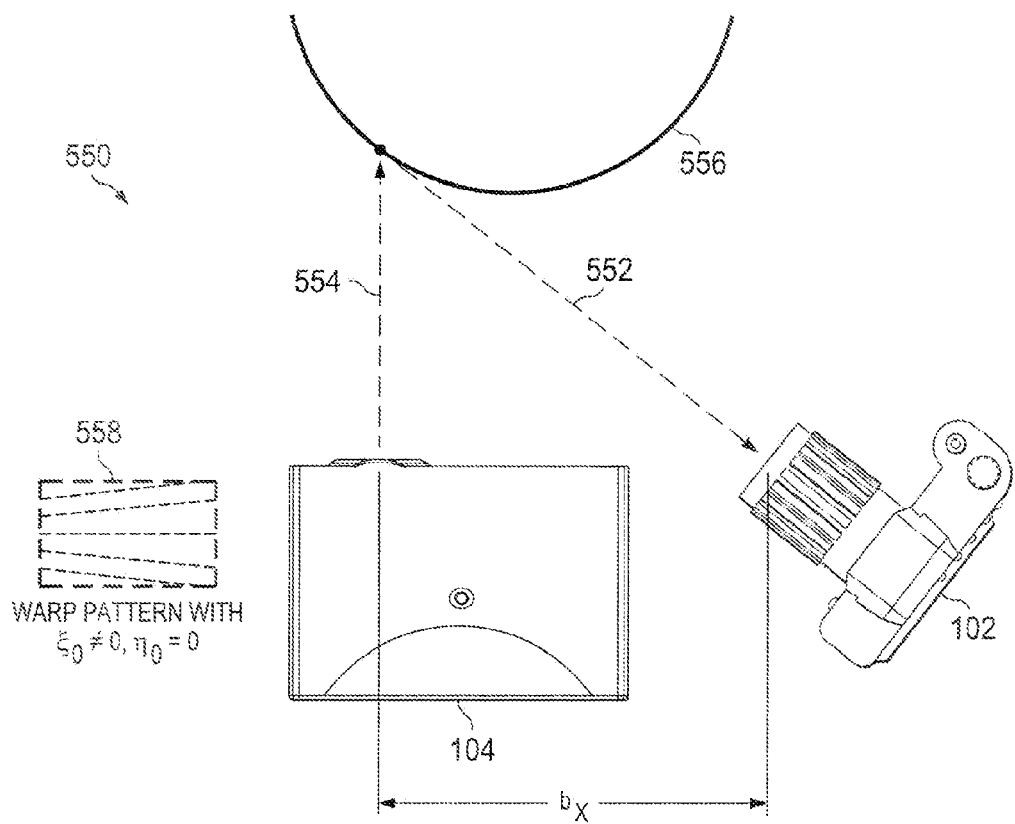
FIG. 5B is a schematic illustrating a calibrated system for achieving structured illumination optical super resolution using an imaging system and an illumination system having crossed optical axes.

FIG. 4A illustrates an embodiment of system 400 where camera 102 is collocated with projector 104. In the embodiment illustrated in FIG. 4A, the spatial disposition of the camera 102 relative to the projector 104 is in the vertical direction. The vertical disposition is represented by a displacement $b_Y$ 420. The displacement of camera 102 is shown in FIG. 4A as displacement $b_Y$ 420. The orientation of the spatial patterns projected by the projector in the embodiment illustrated in FIG. 4A is shown to be periodic in the x direction, as defined by the coordinate system 412 (not to be confused with the coordinate system 430, which shows the coordinate system defining the spatial displacement of the camera 102 relative to the projector 104). For a point of reference, Cartesian coordinate map 430 illustrates the reference coordinate directions for system 400. In embodiments, the periodicity of the spatial patterns 412 may be orthogonal to the direction of spatial disposition of the camera 102 relative to the projector 104. In FIG. 4A, because displacement $b_Y$ 420 is the component of the spatial disposition, the periodicity of the spatial patterns 412 for achieving optical super resolution of horizontally oriented features of object 406 is shown to be in the x direction. In embodiments, projected light 408 may be a sinusoid, with its periodicity in the x direction. Camera 102 includes a lens and image sensor (not shown) that captures light 410 from the object 406. FIG. 4B is a schematic illustrating a different perspective view of the system of FIG. 4A for achieving structured illumination optical super resolution using a camera horizontally collocated with a projector in accordance with embodiments of the present disclosure.

FIG. 5A illustrates system 500, which, in embodiments, may include camera 102 and projector 104. Camera 102 is shown as spatially disposed at an angle θ from projector 104, with horizontal component $b_X$ 522 and vertical component $b_Y$ 520. Spatial pattern 512 is illustrated as having an orientation of its periodicity in a direction orthogonal to the direction of the displacement defined by the angle θ 524. For illustrative purposes, the rectangular boxes represent image plane 514 to show that the spatial pattern 512 may be rotated to an angle orthogonal to the angle θ without rotating the image plane.

FIG. 5B illustrates system 550 where the baseline connecting the center of perspective Oc of the imaging system 102 with the center of perspective Op of the illumination system 104 is within the pupil plane of the imaging system 102. In system 550, which may be a calibrated system configuration, the optical axis 552 of the imaging system 102 is not parallel to the optical axis 554 of the illumination system 104. Illumination system 104 is configured to project a spatial pattern 558 onto object 556 that when viewed from the imaging system 102 viewpoint, exhibits periodicity. Such a crossed axis configuration may be collocated, where $b_Y=0$.

FIG. 6 illustrates an embodiment of the present disclosure showing system 600 having two illumination systems and one imaging system. In FIG. 6, illumination system 604 is horizontally collocated from imaging system 602, displaced from imaging system 602 by some baseline defined by $b_X$ 640. Illumination system 605 is vertically collocated from imaging system 602, displaced by some baseline defined by $b_Y$ 642. For OSR, illumination system 604 projects a spatial pattern 612 with spatial periodicity oriented in the y direction, and illumination system 605 projects a spatial pattern 613 with spatial periodicity oriented in the x direction. The x and y directions are defined for illustrative purposes by the Cartesian map 614.

Figure 7:
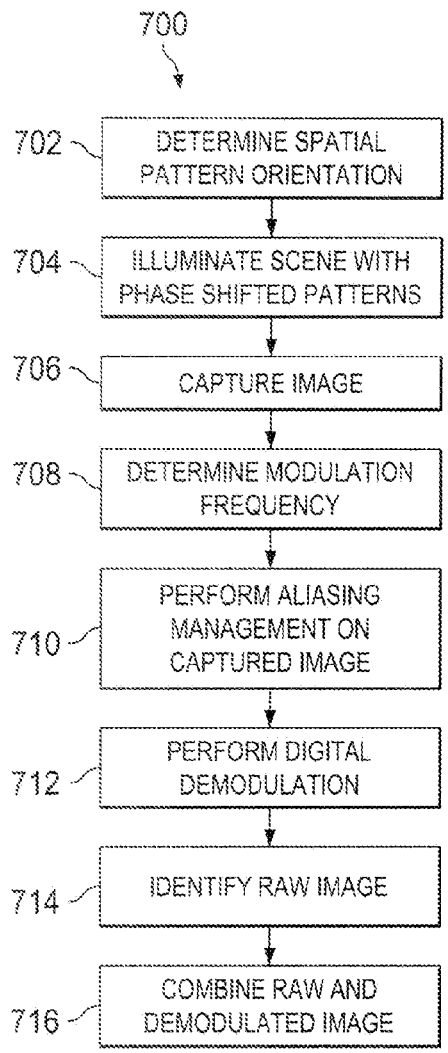
FIG. 7 is a process flow diagram for achieving optical super resolution in accordance with the present disclosure.

FIG. 7 is a process flow diagram 700 illustrating the steps involved in achieving optical super resolution according to the present disclosure. As described above, the orientation of the spatial patterns projected by the projector 104 may be determined based on the configuration of the hardware components (such as the camera 102 and the projector 104). For a given hardware configuration, spatial patterns may be identified (Step 702). Identifying the spatial patterns may include identifying the orientation of the periodicity of the spatial patterns. In addition, the type of spatial patterns may be identified, such as whether the patterns are to be a sinusoid or some other spatial patterns. In addition, other parameters may be identified, such as the amplitude and the frequency of the periodic signal, and whether the patterns will include phase shifted components. In some embodiments, the imaging system may receive a plurality of images of the scene. For example, four patterns may be projected and received (e.g., 0.5*(1+sin( ... )), 0.5*(1−sin( ... )), 0.5*(1+cos( ... )), and 0.5*(1−cos( ... ))) to realize complex sinusoidal modulation using Euler's formula. In other circumstances, three images of the scene may be projected and received (e.g., 0.5+0.25*cos( ... )+0.25*sin( ... ), 0.5+0.25*cos( ... )−0.25*sin( ... ), 0.5−0.25*cos( ... )+0.25*sin( ... )). The three aforementioned patterns may be received as a single frame in embodiments where the three image patterns are in different color planes of a single image.

Processing may occur on each of the color planes separately to demodulate and then may be recombined to achieve OSR imaging. Another example may involve using an equivalent system with polarization states. The captured images contain scene information corresponding to the ambient or unstructured light, as well as modulated scene information due to the structured light. The processor may then demodulate each image and combine the resulting demodulated images with the raw image of the scene (un-modulated image of scene), to create the super-resolved image.

Figure 8A:
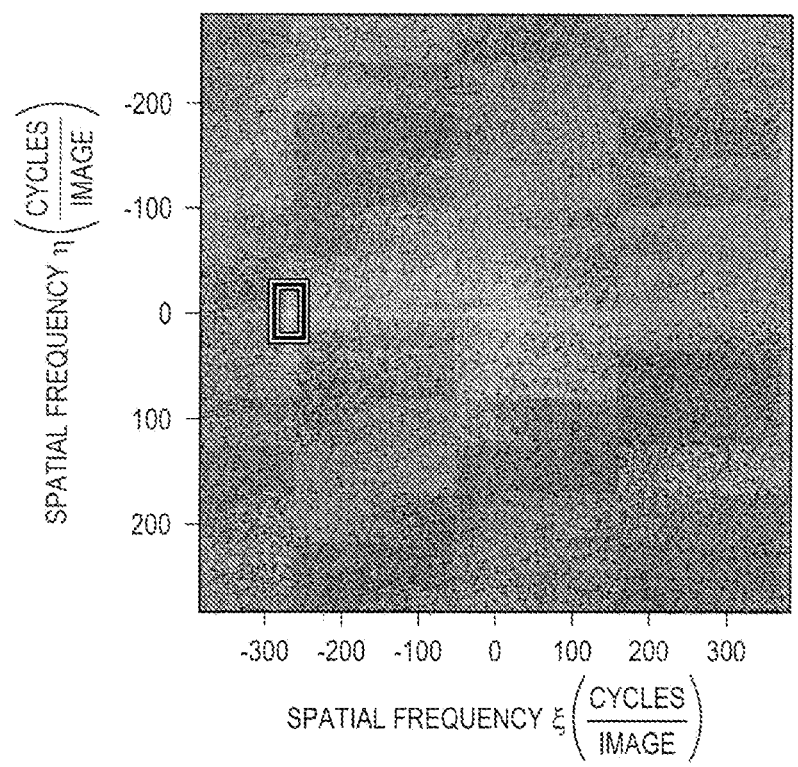
FIGS. 8A-B are example Fourier spectra illustrating spatial frequency peaks used to identify a demodulation frequency in accordance with embodiments of the present disclosure.
Figure 8B:
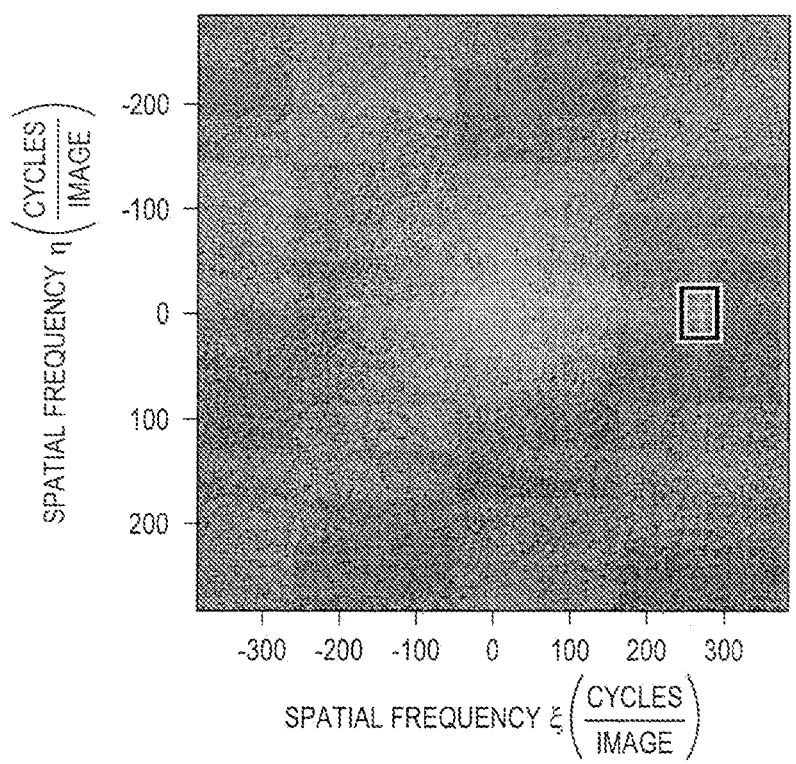

The scene or object 106 is then illuminated by the projector 104, which projects the patterns onto the object 106 (Step 704). In embodiments, the projected light may pass through a beam splitter prior to becoming incident upon the object 106. Light reflected from the object 106 is captured by the camera 102 (Step 706). In embodiments, camera lens 103 focuses the light onto an image sensor, such as a CCD. The captured image may include frequency components based on ambient or other unstructured light as well as the modulated frequencies corresponding to the features on the object 106. In embodiments, the modulation frequency of the modulated image signal may be identified (Step 708) from the captured images. For example, the Fourier transform of the modulated image may be used to identify the modulating frequency. FIGS. 8A-B illustrate an example of the Fourier spectra of the modulated image, showing peaks at certain frequencies away from the DC. The demodulating frequency may be determined as the mean value of the absolute difference in the frequencies of these peaks with respect to DC. In implementations, aliasing management (for example, by way of sinc-interpolation) may be used to ensure that the demodulated frequencies do not appear aliased due to finite pixel pitch of the imaging system (Step 710). Other interpolation methods known to those of skill in the art may be used to perform the aliasing management described herein without deviating from the scope of the disclosure. It is to be understood that OSR may be achieved without performing aliasing management.

The modulated images may be demodulated to recover spatial frequencies outside the optical passband (Step 712). The un-modulated image may also be identified (Step 714), and the demodulated images may be combined with the un-modulated image to achieve a super-resolved image (Step 716). The resulting super resolved image may then be stored or output. Certain of the steps described above may be performed in the order described. In embodiments, some or all of the operations may be performed, and the operations may be performed in a different order than the one described herein, as understood by those of skill in the art.

Figure 12A:
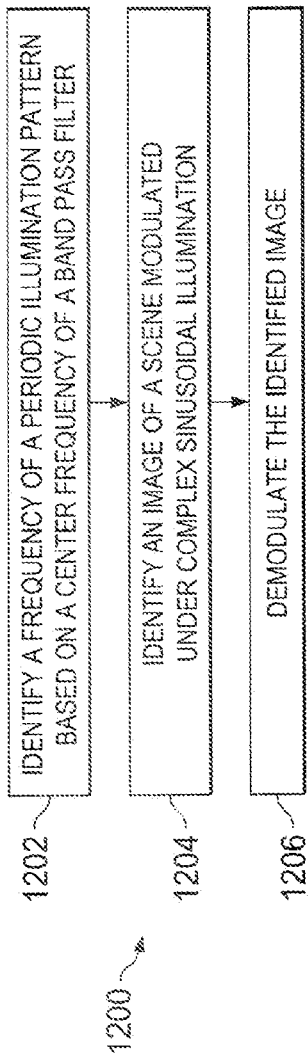
FIG. 12A illustrates a process flow diagram illustrating a method for realizing computational band-pass filtering.
Figure 12B:
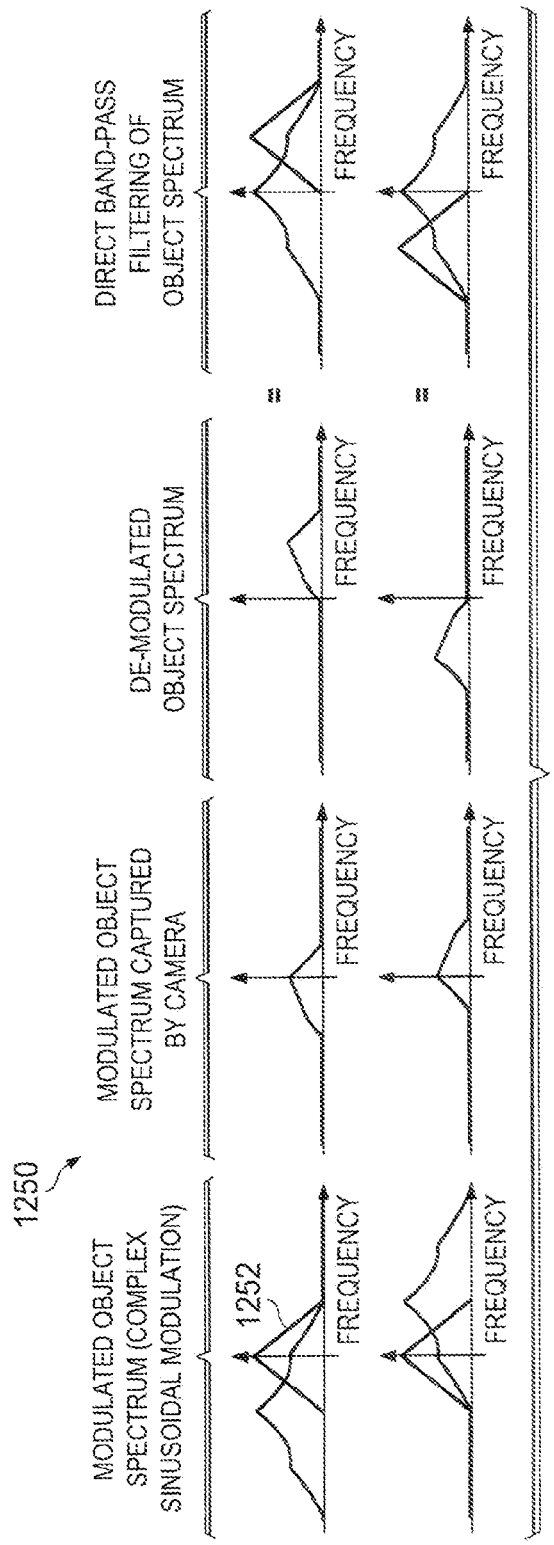
FIG. 12B illustrates the shift in spatial frequency for computational band-pass filtering.

Incoherent imaging systems may act as low-pass filters, limiting the spatial resolution of the imaging system. Task-specific scenarios may exist where the ability to resolve a specific band of frequencies is of particular interest (e.g., fingerprint, iris, edge detection, barcode scanner). The proposed structured illumination OSR scheme can be used to realize computational band-pass filtering, as illustrated in FIG. 12B. The underlying principle is that the process of demodulating the modulated image is equivalent to direct band-pass filtering of the object spectrum.

The structured illumination OSR can be utilized to synthesize a desirable optical transfer function (OTF). For example, the proposed SI-OSR scheme facilitates a diffraction limited ideal low pass OTF for rectangular pupils, whose incoherent OTF is a rectangular pyramid in the frequency domain. Computational methods such as inverse filtering that attempt to generate an ideal low-pass response, but are severely limited by noise, may be avoided. In addition, Incoherent point spread function (PSF) may be avoided to avoid associated difficulties (e.g., due to the unipolar nature thereof) in realizing the image enhancement or restoration tasks, such as high pass filtering and derivative operations.

Figure 10:
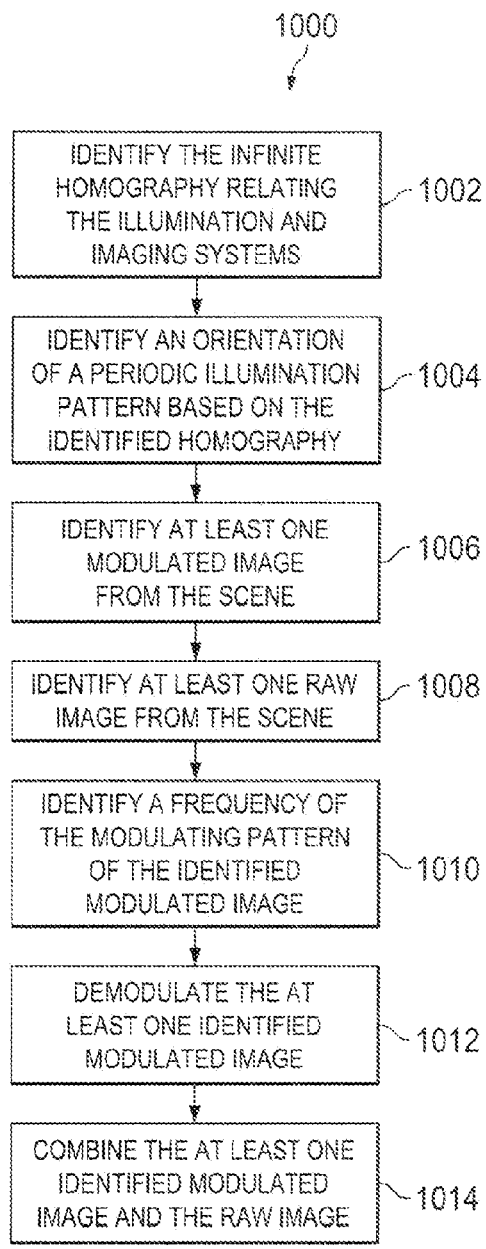
FIG. 10 is a process flow diagram for recovering spatial frequencies.

FIG. 10 illustrates a process flow diagram 1000 for Optical Super-Resolution using Structured Illumination. The operations may be performed in a processor. The infinite homography relating the illumination and imaging systems may be identified (1002). An orientation of a periodic illumination pattern based on the identified homography may be identified (1004). At least one modulated image of the scene due to structured illumination may be identified (1006). In embodiments, the modulated image may be captured or may be synthesized. At least one raw image of the scene due to unstructured illumination may be identified (1008). In embodiments, the raw image may be captured or synthesized. The frequency of the modulating pattern may be identified (1010) from the modulated image. The at least one identified modulated image may be demodulated (1012). The at least one demodulated image with the at least one raw image may be combined (1014).

Figure 11A:
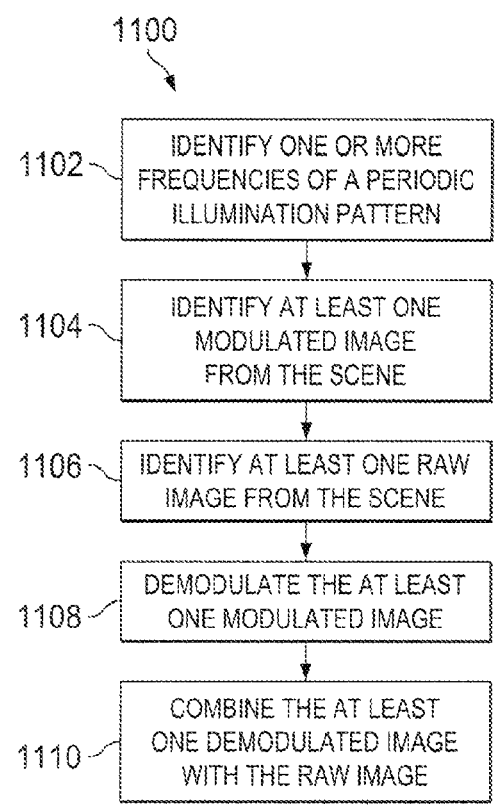
FIG. 11A is a process flow diagram illustrating a method of synthesizing an optical transfer function.

FIG. 11A is a process flow diagram 1100 illustrating a method of synthesizing an optical transfer function. One or more frequencies of a periodic illumination pattern may be identified based on a shape of a desired optical transfer function (1102). At least one image may be captured (1104). The image may include scene information, where the periodic illumination pattern may be modulated by the scene. In addition, one or more images may be identified that represent un-modulated scene information (1106). That is, at least one raw image of the scene may be captured or synthesized. An image of a scene under complex sinusoidal illumination may be identified (1108). In embodiments, the modulated image(s) may be synthesized or may be captured. Further, a raw image of the scene based on uniform illumination may be synthesized. The synthesized image may be demodulated. The demodulated image or images may be combined with the raw image (1110).

Figure 11B:
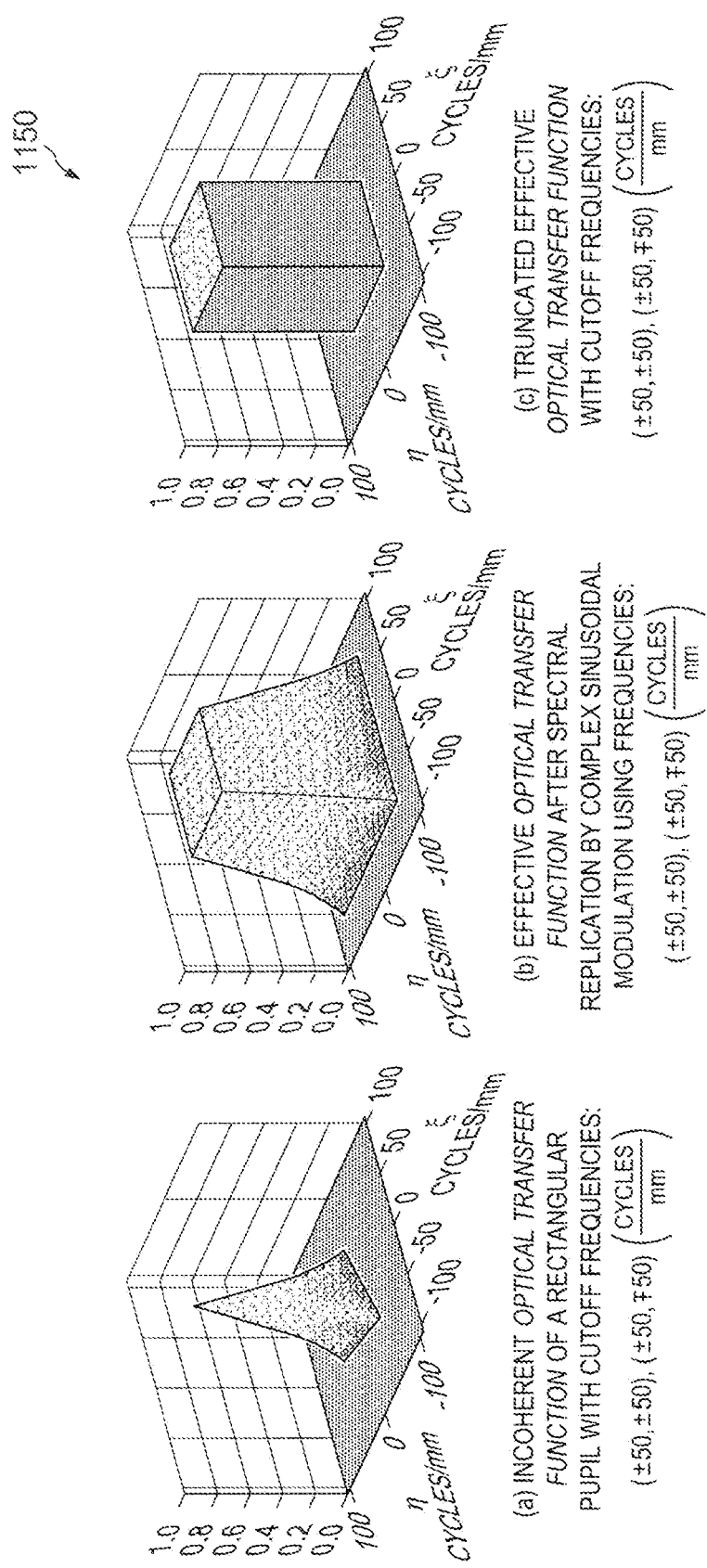
FIG. 11B illustrates graphical representations of three-dimensional optical transfer functions synthesized according to the present disclosure.

FIG. 11B illustrates graphical representations 1150 of three dimensional optical transfer functions synthesized according to the present disclosure. FIG. 11B(a) illustrates an incoherent OTF of a rectangular pupil with particular cutoff frequencies. In FIG. 11B(b) illustrates the effective OTF after spectral replication by complex sinusoidal modulation using the frequencies shown in FIG. 11B(a). The OTF of FIG. 11B(c) is truncated based on the frequencies identified in FIG. 11B(a), to realize an ideal low-pass filter FIG. 12A illustrates a process flow diagram 1200 illustrating a method for realizing computational band-pass filtering. A frequency of a periodic illumination pattern may be identified based on a center frequency of a band-pass filter (1202). An image of a scene obtained under complex sinusoidal illumination may be identified (1204), by projecting phase shifted illumination patterns. In embodiments, the modulated image may be synthesized or may be captured by an imaging system. The modulated image may be demodulated (1206). The demodulation may be performed using an identified or determined modulation frequency. The demodulated synthesized image may be stored. In embodiments, the demodulated synthesized image may be stored without combining the image with raw image data to form a "complete" synthesized, super resolution image.

The optical super resolution methods and systems disclosed herein may have applications beyond taking high-resolution images. For example, the concepts described in this disclosure may be used for high resolution surveillance. Further, the concepts may be used in bar code scanning, counterfeit detection, and high-resolution 3-D image scanning. Other embodiments and advantages are recognizable by those of skill in the art by the foregoing description and the claims.

What is claimed is:

1. A method for capturing images of a scene using an imaging system, the method comprising:
   identifying a plurality of spatially aperiodic patterns;
   illuminating the scene with the plurality of spatially aperiodic patterns using an illumination system;
   identifying a plurality of spatially periodic patterns reflected from the illuminated scene, wherein the plurality of spatially aperiodic patterns are configured to produce the plurality of spatially periodic patterns when reflected from the illuminated scene from the perspective of the imaging system;
   identifying at least one image of the scene, the at least one image having a plurality of modulated components based on modulating the scene with the spatially periodic pattern;
   identifying at least one modulation frequency for the at least one captured image;
   using the identified modulation frequency to demodulate the modulated components of the at least one image; and
   storing the at least one demodulated image.

2. The method of claim 1, further comprising:
   identifying an un-modulated image of the scene;
   combining the un-modulated image with the at least one demodulated image to form a combined image; and
   storing the combined image.

3. The method of claim 1, wherein identifying the at least one modulated image of the scene comprises capturing at least one image of the scene with an imaging system under structured illumination, the at least one image including a plurality of modulated components scene.

4. The method of claim 1, wherein identifying the at least one modulated image of the scene comprises generating the at least one modulated image of the scene under structured illumination.

5. The method of claim 2, wherein identifying the at least one un-modulated image of the scene comprises capturing at least one un-modulated image of the scene under unstructured illumination with an imaging system.

6. The method of claim 2, wherein identifying the at least one un-modulated image of the scene comprises generating un-modulated image of the scene.

7. The method of claim 1, further comprising performing aliasing management on the at least one image.

8. The method of claim 1, wherein the illumination patterns permit complex modulation.

9. The method of claim 1, wherein identifying a modulation frequency comprises:
   calculating a Fourier transform of the at least one image; and
   determining one or more modulation frequencies from the Fourier transform of the at least one image.

10. A perspective imaging apparatus comprising:
    a perspective illumination system capable of projecting a plurality of illumination patterns, the plurality of illumination patterns defining a spatial periodicity from the perspective of the perspective imaging apparatus, the illumination system comprising an illumination center of perspective;
    the perspective imaging apparatus comprising an imaging center of perspective;
    the imaging apparatus spatially disposed from the illumination system such that the imaging center of perspective and the illumination center of perspective define a baseline, the baseline having a direction; and
    wherein the spatial periodicity of the plurality of illumination patterns is oriented in a direction orthogonal to the baseline direction.

11. An apparatus comprising:
    a perspective illumination system having an illumination center of perspective, operable to project a plurality of aperiodic illumination patterns, the plurality of illumination patterns defining a spatial periodicity oriented in a vertical direction when viewed from an imaging location; and
    a perspective imaging system located at the imaging location and having an imaging center of perspective horizontally disposed from the illumination center of perspective.

12. An apparatus comprising:
    a perspective illumination system having an illumination center of perspective, operable to project a plurality of aperiodic illumination patterns, the plurality of illumination patterns defining a spatial periodicity oriented in a horizontal direction when viewed from an imaging location; and
    a perspective imaging system located at the imaging location and having an imaging center of perspective vertically disposed from the illumination center of perspective.

13. A method for recovering spatial frequencies, the method comprising:
    identifying an orientation of a aperiodic illumination pattern, the aperiodic illumination pattern being aperiodic and appearing periodic from the perspective of an image capture system when reflected from a scene;
    illuminating the scene with the aperiodic illumination pattern;
    identifying at least one modulated image of the scene under illumination;
    identifying at least one raw image of the scene;
    identifying one or more frequencies of the pattern of the modulated images;

demodulating the at least one identified modulated image based on the identified one or more frequencies; and combining the at least one demodulated image with the at least one raw image.

14. The method of claim 13, further comprising:
performing aliasing management to capture recovered spatial frequencies.

15. The method of claim 13, wherein identifying at least one modulated image of the scene comprises capturing at least one raw image of the scene, the raw image captured under uniform illumination.

16. The method of claim 13, wherein identifying at least one modulated image of the scene comprises capturing at least one modulated image of the scene.

17. The method of claim 13, wherein identifying at least one modulated image of the scene under periodic illumination comprises generating the image of the scene under periodic illumination.

18. The method of claim 13, wherein identifying at least one raw image of the scene comprises generating the raw image of the scene under unstructured illumination.

19. A method for recovering spatial frequencies, the method comprising:
identifying an infinite homography relating an illumination system and an imaging system;
identifying an orientation of a periodic illumination pattern based on the identified homography, the periodic illumination pattern produced by illuminating a scene with a aperiodic illumination pattern;
identifying at least one modulated image of the scene;
identifying at least one raw image of the scene;
identifying a frequency of the modulating pattern of the identified modulated image;
demodulating the at least one identified modulated image; and
combining the at least one demodulated image with the at least one raw image.

20. The method of claim 19, wherein the illumination pattern is prewarped based on the homography relating to the illumination system and the imaging system.

21. The method of claim 19, wherein identifying the at least one modulated image of the scene comprises capturing the at least one modulated image of the scene under structured illumination.

22. The method of claim 19, wherein identifying the at least one raw image of the scene comprises capturing at least one raw image of the scene using an imaging system, the raw image captured under unstructured illumination.

23. The method of claim 19, wherein identifying the at least one modulated image of the scene comprises generating the image of the scene under structured illumination.

24. The method of claim 19, wherein identifying the at least one raw image of the scene comprises generating the raw image of the scene.

25. A method of synthesizing an optical transfer function, the method comprising:
identifying a plurality of spatially periodic illumination patterns based on a shape and support of a desired optical transfer function;
identifying a plurality of modulated images of a scene under periodic illumination by the plurality of periodic illumination patterns;
identifying at least one raw image of the scene;
demodulating the plurality of modulated images to produce a plurality of demodulated images; and
combining the plurality of demodulated images with the at least one raw image.

26. The method of claim 25, wherein identifying the plurality of modulated images of the scene comprises capturing the plurality of modulated images of the scene.

27. The method of claim 25, wherein identifying the at least one raw image of the scene comprises capturing at least one raw image of the scene under unstructured illumination.

28. The method of claim 25, wherein identifying the plurality of modulated images of the scene comprises generating the plurality of images of the scene under structured illumination.

29. The method of claim 25, wherein identifying the at least one raw image of the scene comprises generating at least one raw image of the scene under unstructured illumination.

30. The method of claim 1, furthering comprising warping a plurality of spatially periodic patterns to produce the plurality of spatially aperiodic patterns.

* * * * *